(12) United States Patent
Riise et al.

(10) Patent No.: US 7,884,140 B2
(45) Date of Patent: Feb. 8, 2011

(54) COMPOSITIONS OF MATERIALS CONTAINING RECYCLED PLASTICS

(75) Inventors: Brian L. Riise, San Ramon, CA (US); Laurence E. Allen, III, San Rafael, CA (US); Ron C. Rau, Oakland, CA (US); Michael B. Biddle, El Cerrito, CA (US)

(73) Assignee: MBA Polymers, Inc., Richmond, CA (US)

( * ) Notice: Subject to any disclaimer, the term of this patent is extended or adjusted under 35 U.S.C. 154(b) by 1098 days.

(21) Appl. No.: 10/511,109

(22) PCT Filed: Apr. 14, 2003

(86) PCT No.: PCT/US03/11602

§ 371 (c)(1),
(2), (4) Date: Mar. 30, 2005

(87) PCT Pub. No.: WO03/087215

PCT Pub. Date: Oct. 23, 2003

(65) Prior Publication Data

US 2005/0179153 A1    Aug. 18, 2005

Related U.S. Application Data

(60) Provisional application No. 60/372,001, filed on Apr. 12, 2002.

(51) Int. Cl.
*C08J 11/04* (2006.01)
(52) U.S. Cl. ............... 521/40; 521/40.5; 521/41; 521/46; 521/46.5; 521/47; 521/49
(58) Field of Classification Search ............ 521/40, 521/40.5, 46, 46.5, 47, 49, 41
See application file for complete search history.

(56) References Cited

U.S. PATENT DOCUMENTS

| | | | |
|---|---|---|---|
| 4,296,022 A | 10/1981 | Hudson | |
| 5,026,512 A | 6/1991 | Chang | |
| 5,091,477 A | 2/1992 | Bueschl et al. | |
| 5,131,212 A | 7/1992 | Grey et al. | |
| 5,298,214 A | 3/1994 | Morrow et al. | |
| 5,393,835 A | 2/1995 | Eckel et al. | |
| 5,420,181 A | 5/1995 | Eichenauer et al. | |
| 5,424,013 A | 6/1995 | Lieberman | |
| 5,569,713 A | 10/1996 | Lieberman | |
| 5,643,985 A | 7/1997 | Hoffmann et al. | |
| 5,653,867 A | 8/1997 | Jody et al. | |
| 5,712,336 A * | 1/1998 | Gareiss et al. | 524/373 |
| 5,895,790 A | 4/1999 | Good | |
| 5,951,940 A | 9/1999 | Nosker et al. | |
| 6,007,005 A | 12/1999 | Gonzales et al. | |
| 6,090,862 A | 7/2000 | Tatsuda et al. | |
| 6,114,401 A | 9/2000 | Doonan | |
| 6,214,915 B1 | 4/2001 | Avakian et al. | |
| 6,217,804 B1 | 4/2001 | Lieberman | |
| 6,232,393 B1 | 5/2001 | Dadgar et al. | |
| 6,274,637 B1 * | 8/2001 | Schallenberg | 521/40 |
| 6,303,069 B1 | 10/2001 | Anhalt et al. | |
| 6,355,739 B1 | 3/2002 | Tsai et al. | |
| 6,452,126 B1 | 9/2002 | Xiao et al. | |
| 6,460,788 B1 | 10/2002 | de Feraudy | |
| 6,489,390 B1 * | 12/2002 | Landry | 524/467 |
| 6,689,838 B1 | 2/2004 | Fischer et al. | |
| 7,037,951 B2 | 5/2006 | Inagaki | |
| 2004/0004033 A1 | 1/2004 | Vandeputte | |
| 2004/0164005 A1 | 8/2004 | Allen, III | |
| 2004/0182753 A1 | 9/2004 | Allen, III et al. | |

FOREIGN PATENT DOCUMENTS

| | | |
|---|---|---|
| DE | 40 20 417 A | 1/1992 |
| DE | 42 26 516 | 2/1994 |
| DE | 44 43 889 | 6/1996 |
| DE | 44 24 143 A | 11/1996 |
| DE | 0761 763 A | 3/1997 |
| DE | 196 25 110 | 12/1997 |
| DE | 197 15 418 A | 10/1998 |
| DE | 197 44 964 A | 4/1999 |
| DE | 692 26 359 | 4/1999 |
| DE | 695 14 291 | 6/2000 |
| DE | 199 05 341 | 8/2000 |
| EP | 272 114 | 6/1988 |
| EP | 313 862 | 5/1989 |
| EP | 0 696 618 | 2/1996 |

(Continued)

OTHER PUBLICATIONS

Ruth M. Campomanes et al., "Studies on Morphology and Mechanical Properties of PP/ HIPS Blends from Postconsumer Pastic Waste", 2003, Journal of Applied Polymer Science, vol. 87, pp. 747-751.

(Continued)

*Primary Examiner*—Edward J Cain
(74) *Attorney, Agent, or Firm*—Fish & Richardson P.C.

(57) ABSTRACT

Techniques for creating recycled plastic materials from waste plastic materials are described. A recycled plastic material contains at least a primary polymer, a secondary polymer, and residual additives. Predetermined properties of the recycled plastic material can be controlled by selecting the types of waste plastic materials used in the recycling feed, determining the types and amounts of recycled plastic material recovered from a separation process and blending the recycled plastic material with other materials.

53 Claims, 18 Drawing Sheets

FOREIGN PATENT DOCUMENTS

| | | |
|---|---|---|
| EP | 0 696 618 A | 2/1996 |
| EP | 0 933 401 | 8/1999 |
| EP | 1 113 101 | 7/2001 |
| EP | 1 226 913 A1 | 7/2002 |
| EP | 1 484 146 | 12/2004 |
| EP | 1 495 074 | 1/2005 |
| EP | 0 662 101 | 5/2009 |
| GB | 1273389 | 5/1972 |
| JP | 07-025943 A | 5/1995 |
| JP | 08-259747 A | 2/1997 |
| JP | 2001-323121 | 11/2001 |
| JP | 2002-088212 | 3/2002 |
| JP | 2002-292628 | 10/2002 |
| WO | WO 92/15640 | 9/1992 |
| WO | WO 92/20733 | 11/1992 |
| WO | WO 94/07946 | 4/1994 |
| WO | WO 94/07950 | 4/1994 |
| WO | WO 98/03318 | 1/1998 |
| WO | WO 99/07778 | 2/1999 |
| WO | WO 99/25493 A | 5/1999 |
| WO | WO 01/81058 A | 11/2001 |
| WO | WO 03/086733 | 10/2003 |
| WO | WO 2004/009200 A1 | 1/2004 |
| WO | WO 2004/009242 A1 | 1/2004 |
| WO | WO 2005/123817 A1 | 12/2005 |

OTHER PUBLICATIONS

D. E. Karvelas et al., "Separation and Recovery of Thermoplastics by Froth Floatation", Nov. 9-11, 1999, 6th Annual Recycling Conference Proceedings Book, Detroit, Michigan, pp. 233-237.

Xiaodong Liu et al., "Recycling of ABS and ABS/PC Blends", 1999, Journal of Applied Polymer Science, vol. 74, pp. 510-515.

L.A. Utracki, Polymer Blends Handbook, vol. 1, 2002, pp. xi-xii, 12-36, 55-69, 75-76, 93-96, 203-289, 295-296, 307, 316, 339-347, 577-641.

L.A. Utracki, Polymer Blends Handbook, vol. 2, 2002, pp. 977-1015, 1023-1160.

First Examination Report for Application No. IN 2533/CHENP/2004, dated Aug. 21, 2009, 2 pages.

Notification of the First Office Action for Application No. CN 03813327.X, dated Mar. 24, 2006, 4 pages.

Notification of the Second Office Action for Application No. CN 03813327.X, dated May 23, 2008, 4 pages.

Notification of Third Office Action for Application No. CN 03813327.X, dated Oct. 31, 2008, 4 pages.

Notification of the Fourth Office Action for Application No. CN 03813327.X, dated May 8, 2009, 4 pages.

Notification of the Fifth Office Action for Application No. CN 03813327.X, dated Aug. 28, 2009, 5 pages.

Notice of Reasons for Rejection for Application No. JP 2003-584166 dated Dec. 12, 2008, 9 pages.

Communication pursuant to Article 96(2) EPC for Application No. EP 03 731 026.5, dated Dec. 13, 2004, 4 pages.

Communication pursuant to Article 96(2) EPC for Application No. EP 03 731 026.5, dated Jul. 13, 2005, 2 pages.

Communication pursuant to Article 96(2) EPC for Application No. EP 03 731 026.5, dated Oct. 26, 2005, 4 pages.

Communication pursuant to Article 96(2) EPC for Application No. EP 03 731 026.5, dated May 11, 2006, 3 pages.

Communication pursuant to Article 96(2) EPC for Application No. EP 03 731 026.5, dated Sep. 19, 2006, 3 pages.

Communication pursuant to Article 96(2) EPC for Application No. EP 03 731 026.5, dated Aug. 20, 2007, 4 pages.

Communication pursuant to Article 94(3) EPC for Application No. EP 03 731 026.5, dated Jan. 28, 2008, 4 pages.

Communication pursuant to Article 94(3) EPC for Application No. EP 03 731 026.5, dated Jun. 10, 2008, 3 pages.

Abfallsortierung—Kunstoffe und Verbunde, UTA, vol. 11, T.2, S105-107, ISSN 0941-2026, 2000, 3 pages [with English (machine) translation included, 8 pages].

ATI Bayblend R-FR 390 und R-FR 610, Geschaftsbereich Kunststoffe, Jun. 30, 1995, 4 pages.

Brennan, "Recycling Abs and Hips from Waste Electrical and Electronic Components," Department of Materials Engineering, University of Wales, Apr. 2000, 8 pages.

Breuer, "Hautverträglichkeit der Syntal/Wümwood-Profile," Kunststoff und Recycling, Aug. 15, 1998 [with English (machine) translation included, 2 pages].

Chapman & Hall, "Additives are essential," 1998, 4 pages.

Bandrup et al., "Die Wiederverwendung von Kunststoffen," Hanser Verlag, 1995, 66 pages [with English (machine) translation included, 204 pages].

Diplomarbeit, "Untersuchung der Recyclingfähigkeit ausgewählter KFZ-Frontscheinwerfer," von Boris Weber, angefertigt an der Fachhochschule Darmstadt, Fachbereich Kunststofftechnik, (2000), 90 pages [with English (machine) translation included, 129 pages].

Endler, "Systemtechnische Aspekte bei der verfahrenstechnischen Gestaltung von Compoundierlinien unter besonderer Berücksichtigung der Aufbereitung von Kunststoffabfällen," Kunststoff-Recycling Kolloquium, 1996, 20 pages [with English (machine) translation included, 20 pages].

Forschungsbericht der Metallgesellschaft Nr. 123, veröffentlicht, 1988, 176 pages [with English (machine) translation included, 382 pages].

Forschungsbericht der Metallgesellschaft Nr. 140, veröffentlicht, 1993, 158 pages [with English (machine) translation included, 364 pages].

Gächter and Müller, "Taschenbuch der Kunststoff-Additive," Carl Hanser Verlag München Wien, 1979, 3 pages [with English translation included, 4 pages].

Garbe, "Wirtschaftlichkeitsbetrachtungen bei der Verwertung von Kunststoffabfällen," Abfallwirtschaft, Oct. 1993, 4 pages [with English (machine) translation included, 13 pages].

Hess, "Modifications of plastic wastes by blending, filling and reinforcement" and "Recycling of thermoplastic wastes," Düsseldorf: VDI-Verlag, 1979, 17 pages.

Ilgemann et al., "Effect of Repeated Injection-Moulding on the Properties of General-Purpose Polystyrene Moulding Compounds and Finished Articles," Proceedings and Discussions-International Plastics Congress, 1966, 14 pages [with English Abstract].

Liu et al., "Recycling of ABS and ABS/PC Blends," Journal of Applied Polymer Science, 1999, pp. 510-515.

Material safety data sheet from Joseph T. Ryerson & Son Inc. for Plastics Thermoplastics Polypropylene, published Nov. 8, 1985, 3 pages.

MBA Polymers, Inc., "Recovery of Plastics from Municipally Collected Electrical and Electronics Goods," Mar. 1999, 16 pages.

Menges et al., "Recycling Plastics," Carl Hanser Verlag, 1992, 25 pages [with English translation included, 25 pages].

Meyer, "Adding Value to Polymers," Department of Materials, Institute of Polymers, Zurich, Switzerland, 2001, 4 pages.

Obieglo et al., "Compatibilizer Ein Schluessel zum Recycling," Kunststoffe, Nov. 1993, 4 pages [with English translation included, 5 pages].

Pfaff, "Entwicklungsarbeiten zur Wiederverwendung der Kunststoffschrotte einer Sekundärbleihütte auf Akkuschrottbasis," BMFT Berichte, Mar. 29, 1988, 175 pages [with English (machine) translation included, 126 pages].

Bandrup et al. (ed.), "Physical Constants of Poly(ethylene), Polymer Handbook, Third Edition, John Wiley & Sons, New York, 1989, 6 pages.

Pospisil et al., "Upgrading of recycled plastics by restabilization—an overview," Polymer Degradation and Stability, 1995, vol. 48, pp. 351-358.

Printouts for ASTM test standards, printed on Mar. 16, 2010, 10 pages.

J. Schiebisch, "Allgemeine Zusammenhange zwischen Eigenschaften and Recycling, Begriffsdefinitionen," Lehrstuhl Fur Kunststofftechnik, Universitat Erlangen-Nurnberg, 1994, 29 pages [with English (machine) translation included, 29 pages].

unbekannt, "Grundig Fachtagung—Ökotechnologie," Grundig Fachtagung—Ökotechnologie, Nov. 1996, 2 pages [with partial English translation included, 2 pages].

unbekannt, "Stoff-und Energieanalyse von Pflanzentöpfen aus unterschiedlichen Materialien," Stoff-und Energieanalyse von Pflanzentöpfen aus unterschiedlichen Materialien, 1993, 218 pages [with English (machine) translation included, 203 pages].

Utracki, "Economics of Polymer Blends," Polymer Engineering and Science, 1982, 22(17), pp. 1166-1175.

Utracki, "Reprocessing of Commingled Polymers and Recycling of Polymer Blends," Frontiers in the Science and Technology of Polymer Recycling, 1998, 7 pages.

Vogel, "Einfluss wiederholter Verarbeitung von Styrolpolymerisaten und Polyolefinen auf die Eigenschaften des Fertigteils," Kunststoffe—Plastics, Mar. 1975, 6 pages [with English (machine) translation included, 15 pages].

* cited by examiner

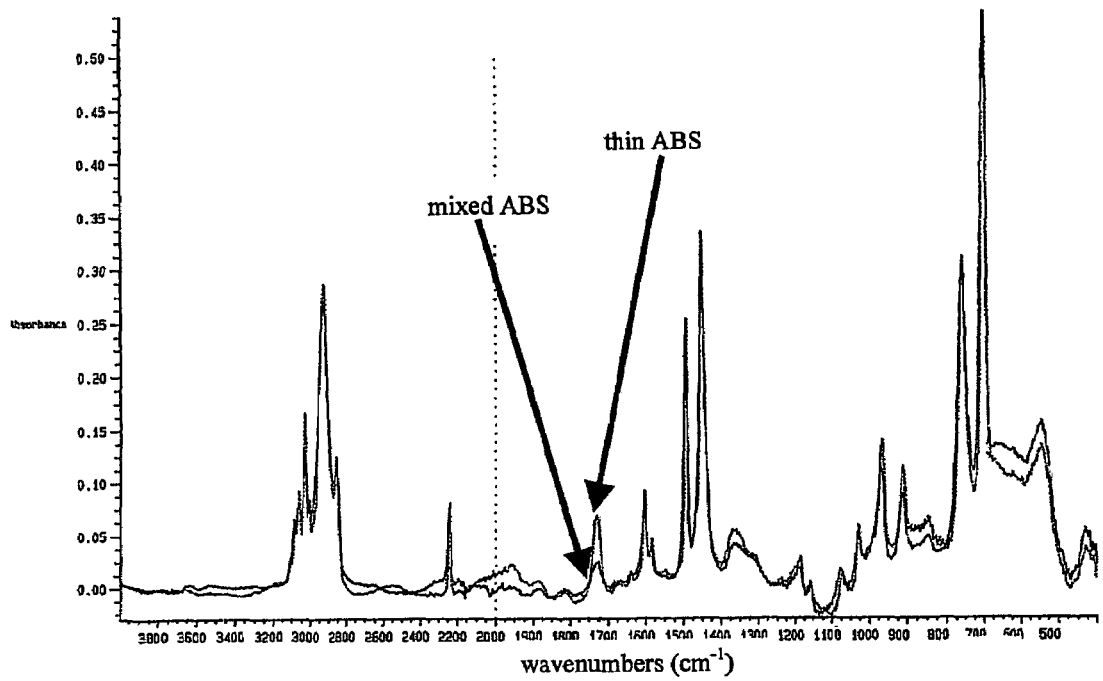
FIG._ 2
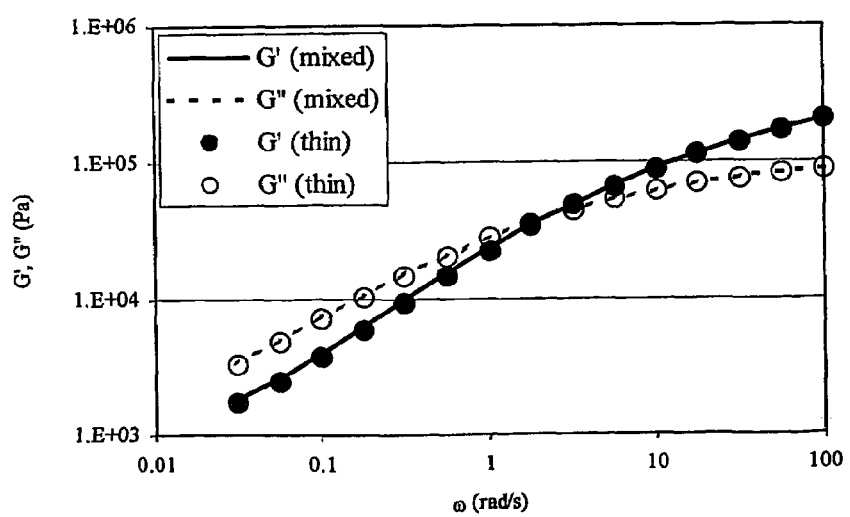
FIG._ 3

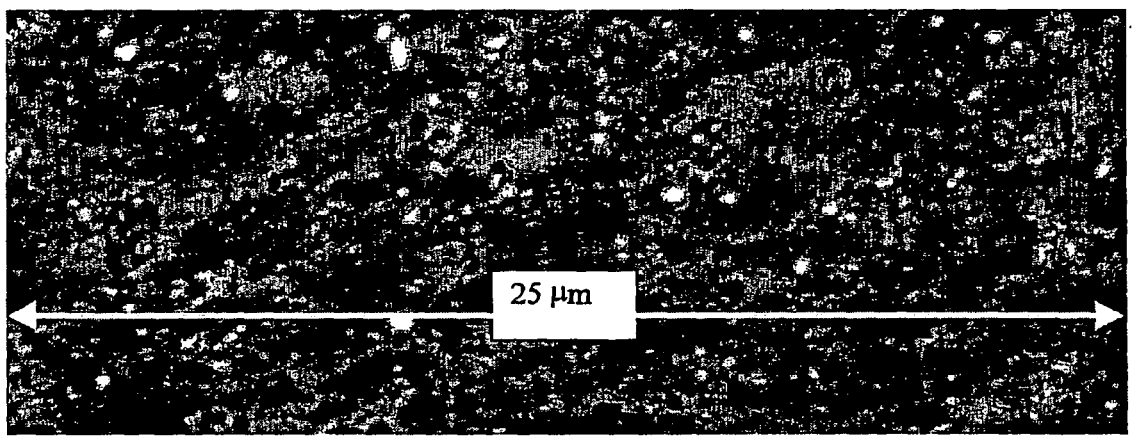
FIG._ 4

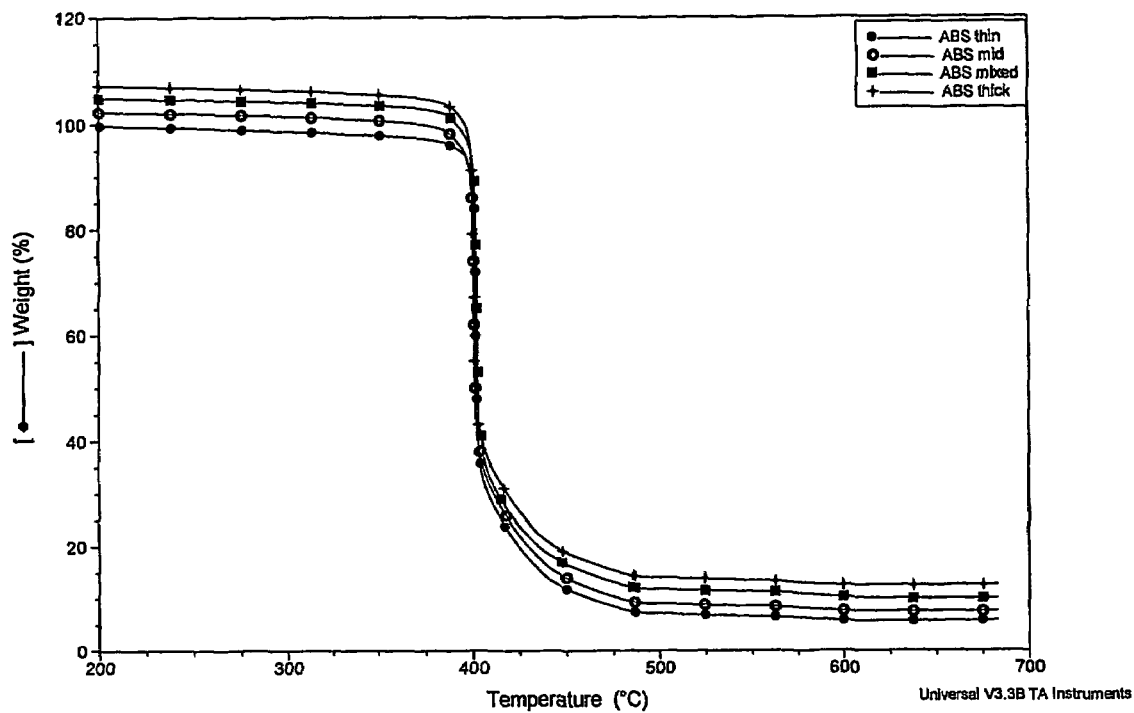
FIG._ 5

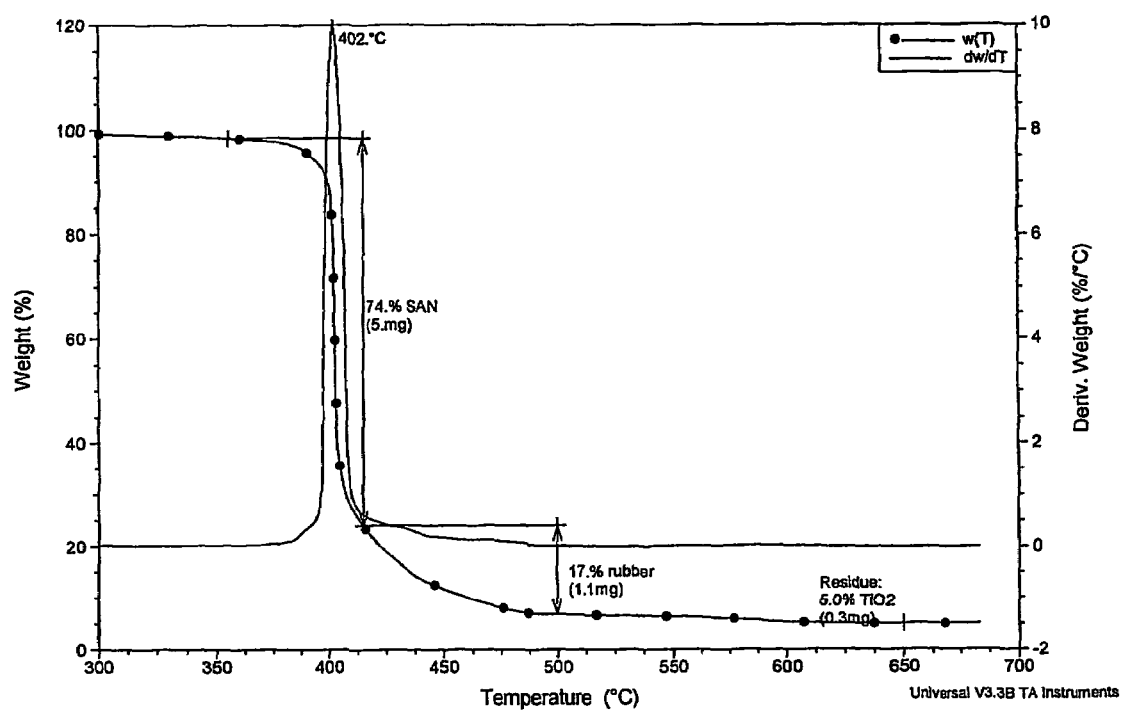
FIG._ 6

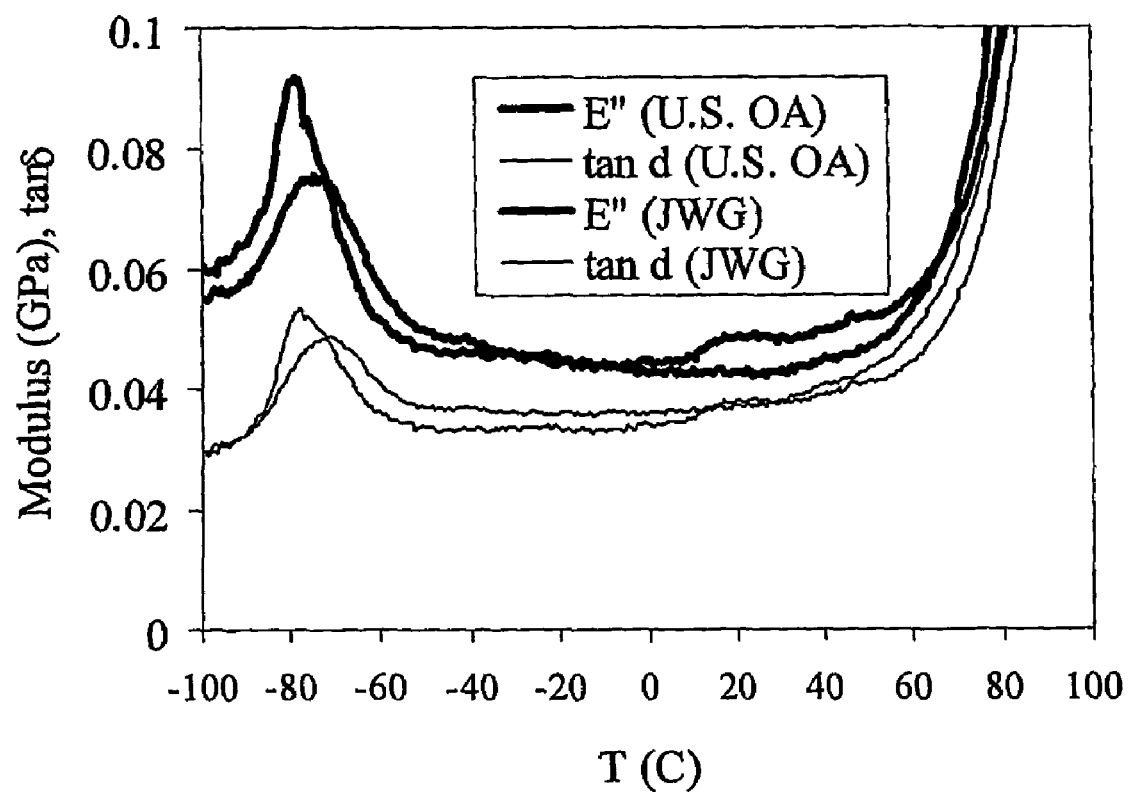
FIG._ 7

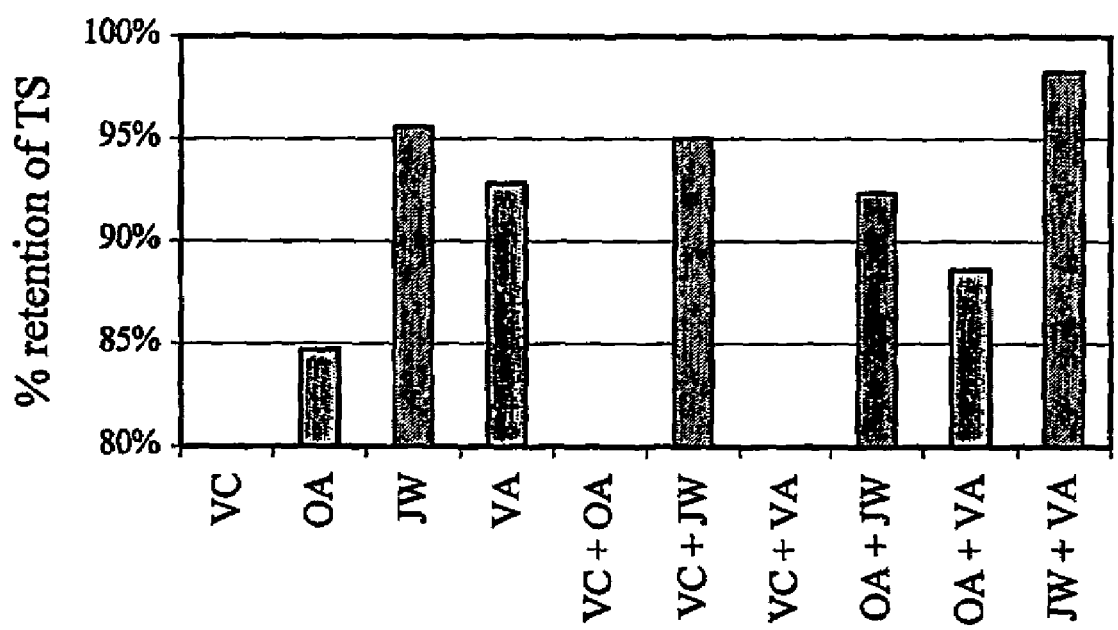
FIG._ 8

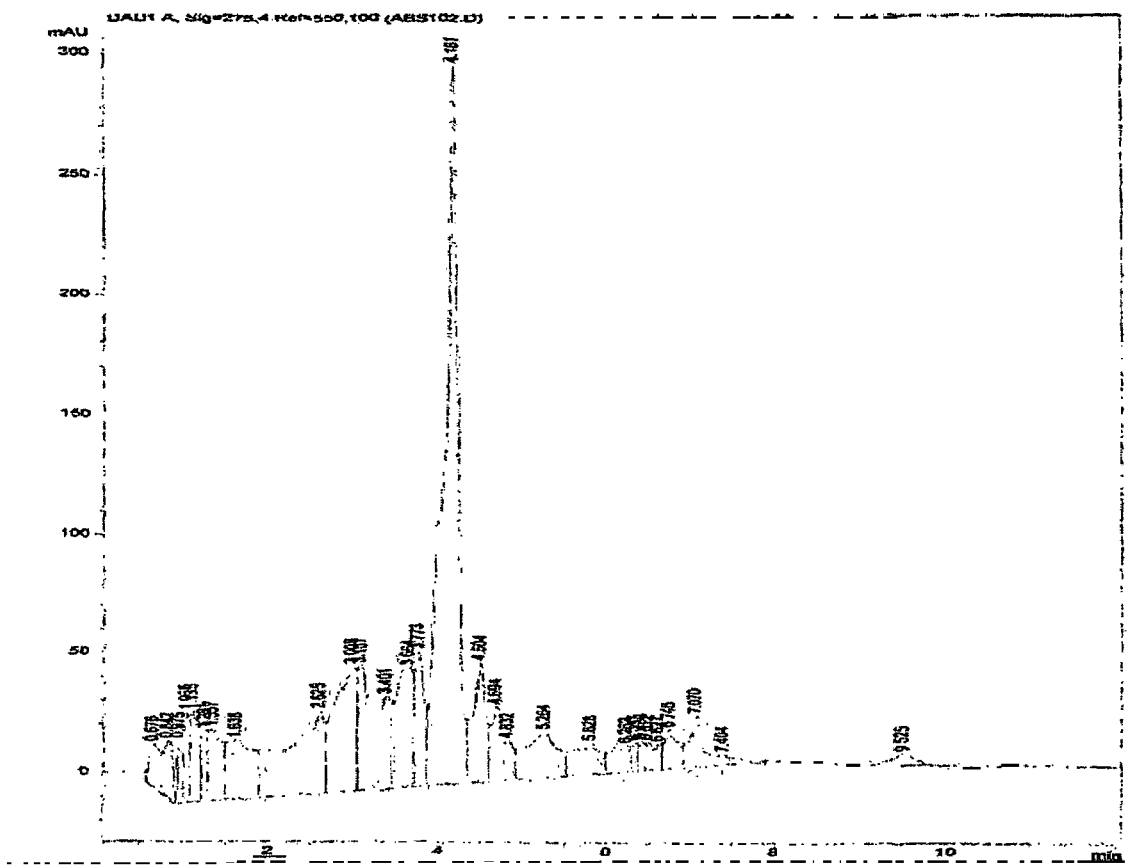
FIG._ 9

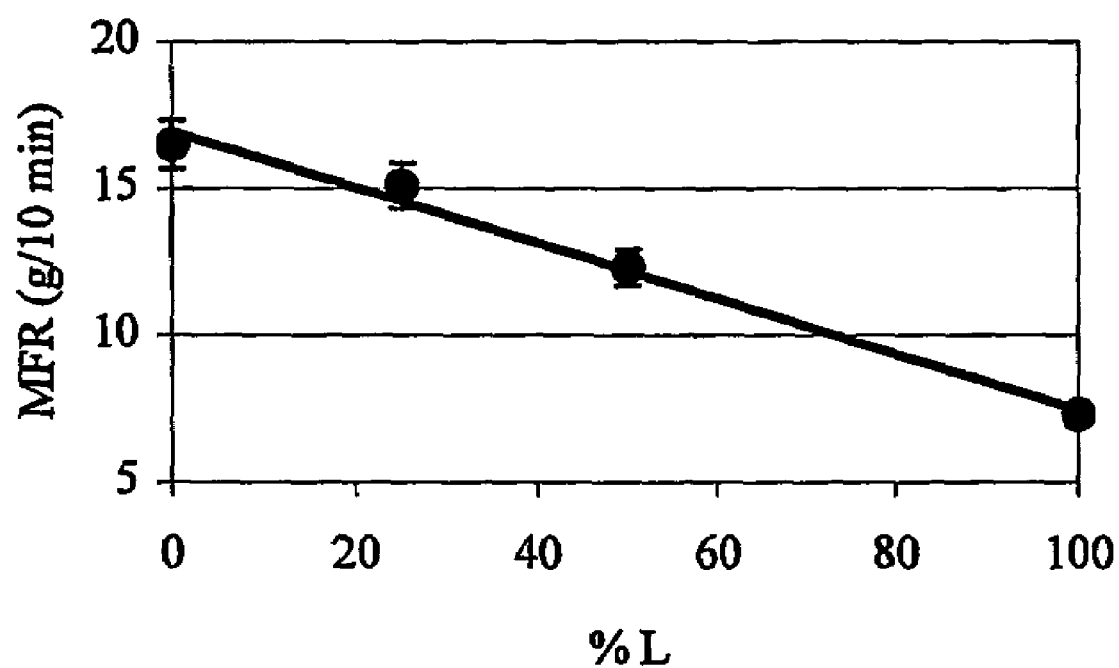
FIG._ 10

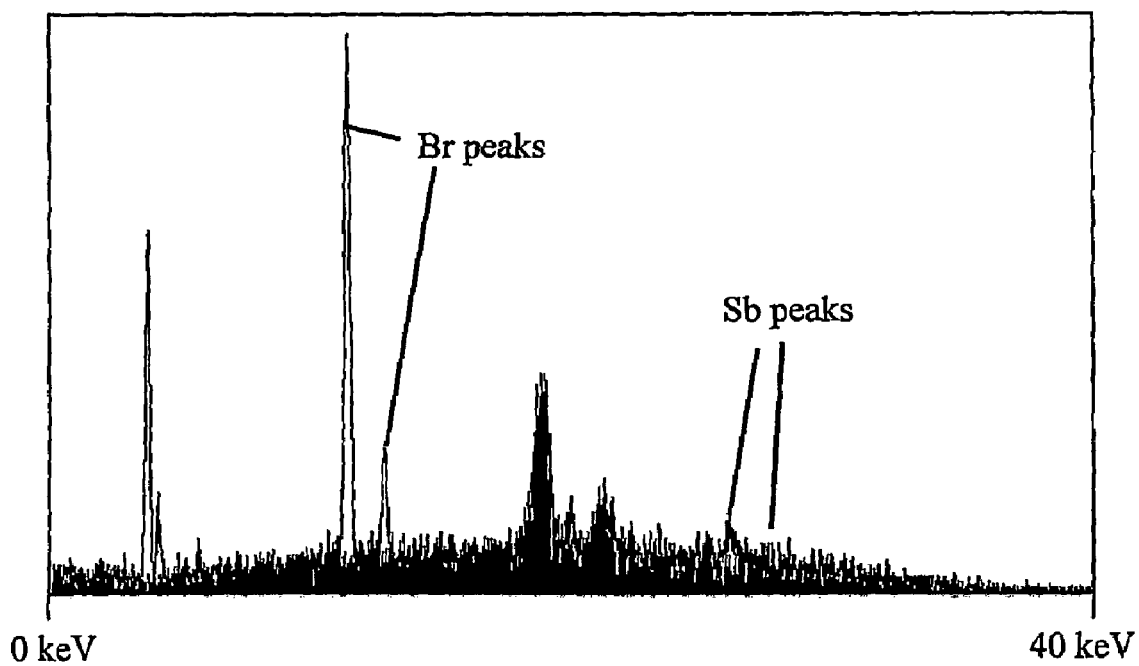
FIG._11

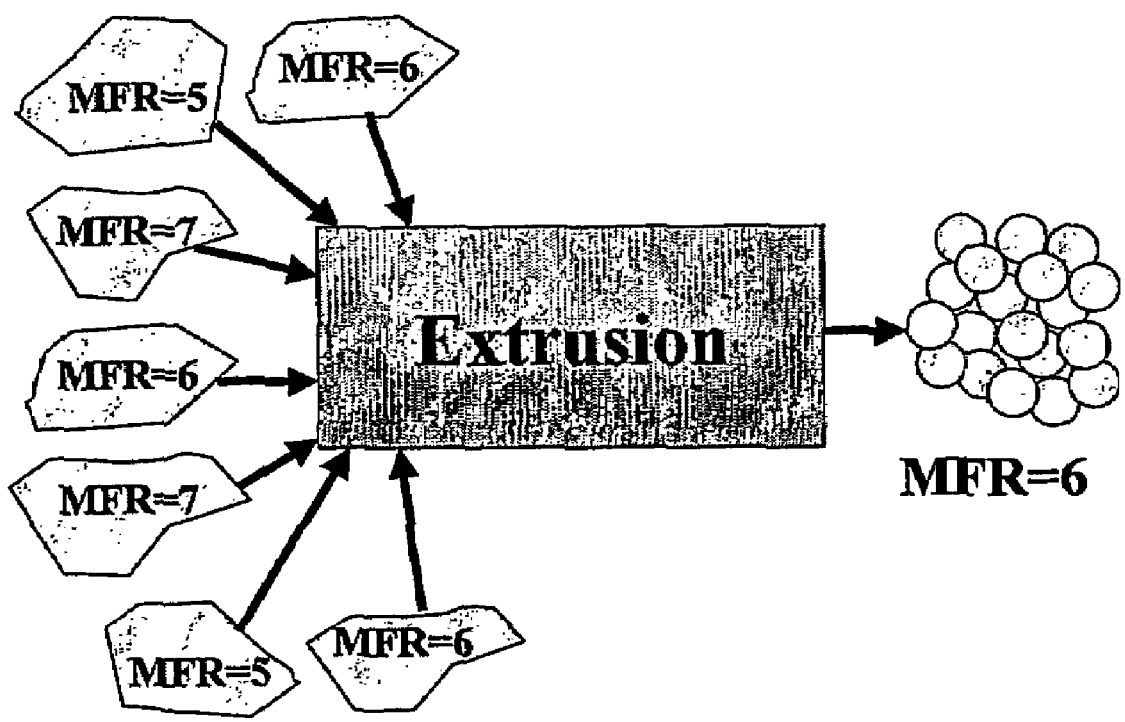
FIG._12

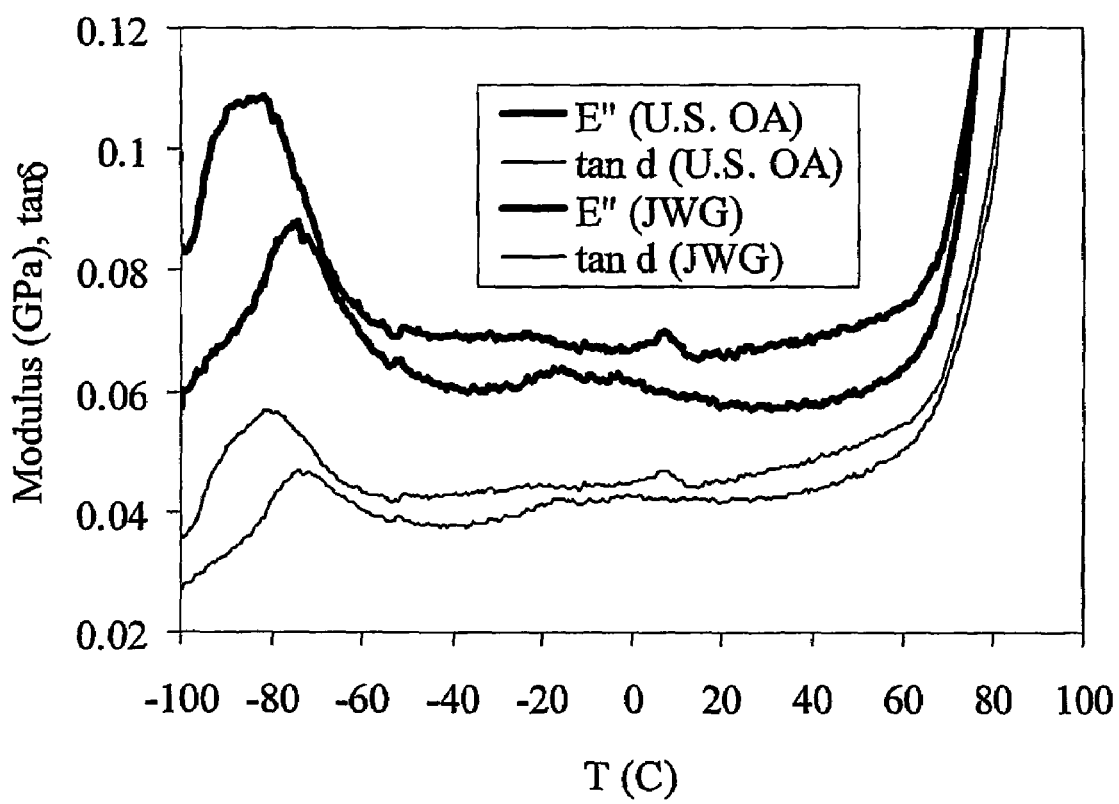
FIG._ 13

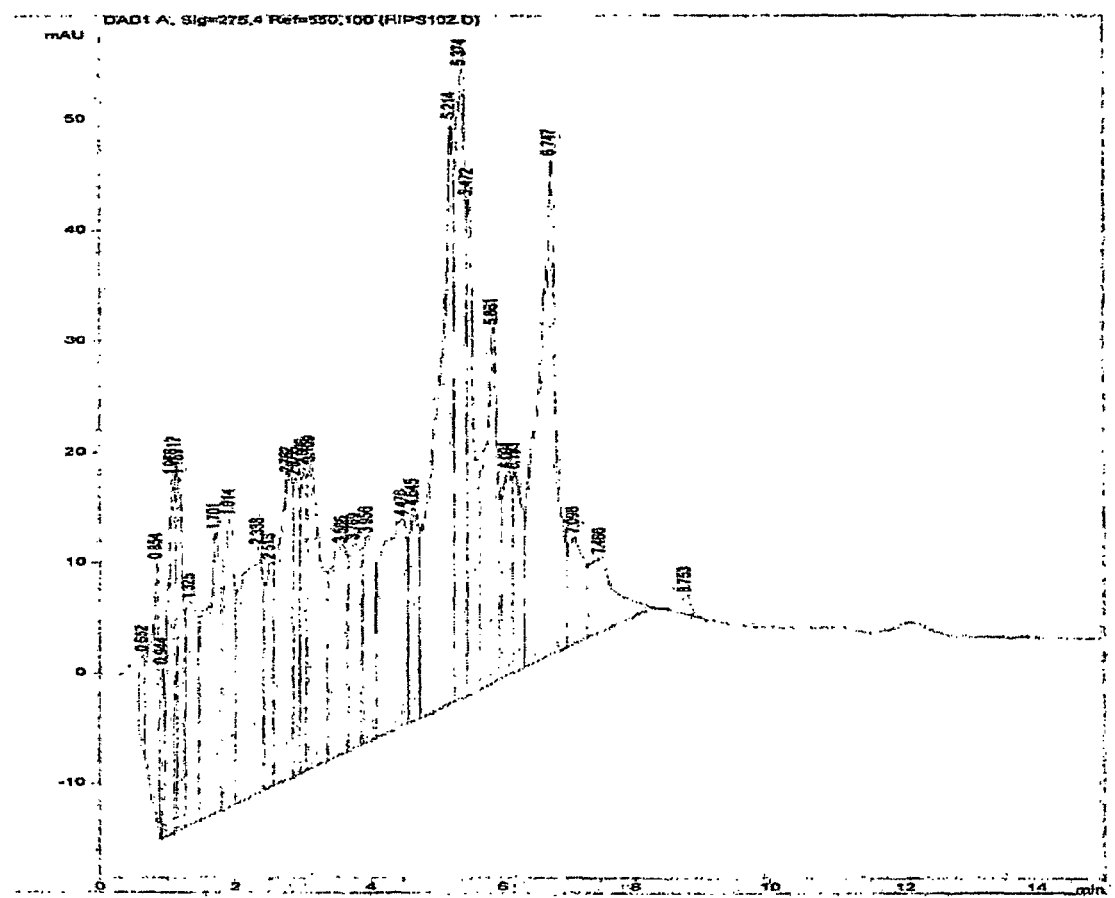
FIG._ 14

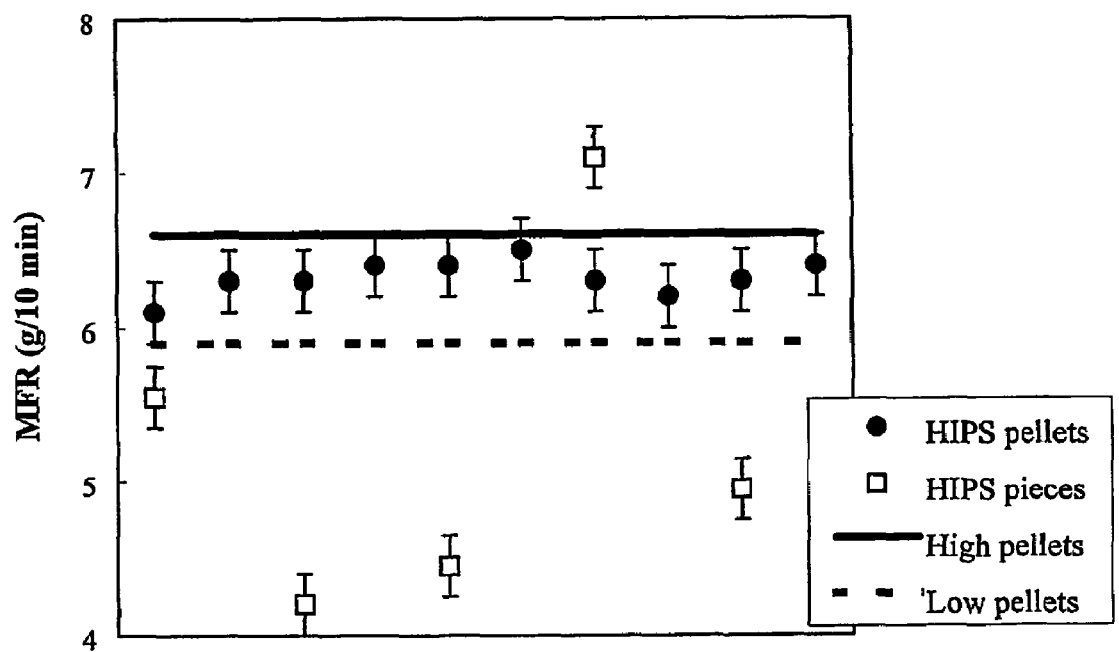
FIG._15

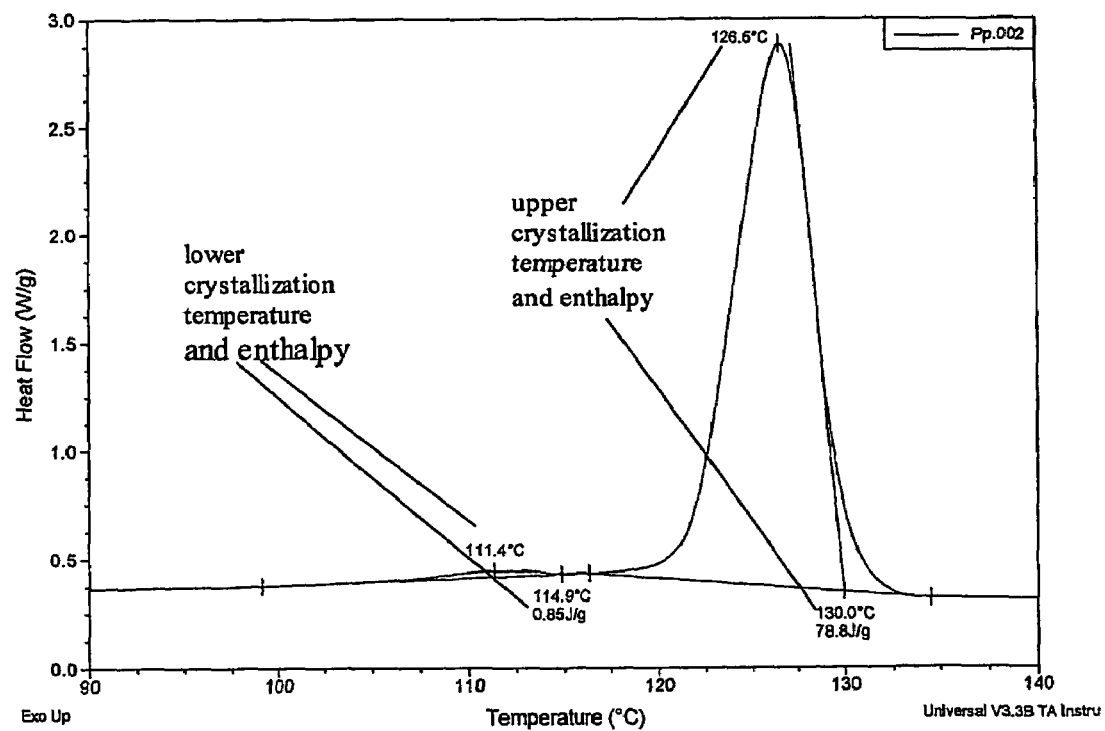
FIG._16

FIG._ 18

COMPOSITIONS OF MATERIALS CONTAINING RECYCLED PLASTICS

This application claims the benefit of Provisional Application No. 60/372,001, filed Apr. 12, 2002, which is incorporated by reference herein. This application is also related to International Application Serial No. PCT/US03/11642, titled "Multistep Separation of Plastics" to Lawrence E. Allen, III, Brian L. Riise, Paul C. Allen, Ron C. Rau, and Michael B. Biddle filed on Apr. 14, 2003, which is also incorporated by reference herein.

TECHNICAL FIELD

This invention relates to recycling plastic.

BACKGROUND

Products made from or incorporating plastic are a part of almost any work place or home environment. Generally, the plastics that are used to create these products are formed from virgin plastic materials. That is, the plastics are produced from petroleum and are not made from existing plastic materials. Once the products have outlived their useful lives, they are generally sent to waste disposal or a recycling plant.

Recycling plastic has a variety of benefits over creating virgin plastic from petroleum. Generally, less energy is required to manufacture an article from recycled plastic materials derived from post-consumer and post-industrial waste materials and plastic scrap (collectively referred to in this specification as "waste plastic material"), than from the comparable virgin plastic. Recycling plastic materials obviates the need for disposing of the plastic materials or product. Further, less of the earth's limited resources, such as petroleum and polymers, are used to form virgin plastic materials.

When plastic materials are sent to be recycled, the feed streams rich in plastics may be separated into multiple product and by product streams. Generally, the recycling processes can be applied to a variety of plastics-rich streams derived from post-industrial and post-consumer sources. These streams may include, for example, plastics from office automation equipment (printers, computers, copiers, etc.), white goods (refrigerators, washing machines, etc.), consumer electronics (televisions, video cassette recorders, stereos, etc.), automotive shredder residue, packaging waste, household waste, building waste and industrial molding and extrusion scrap.

Different types of plastic parts are often processed into shredded plastic-rich streams. The variety of parts can vary from a single type of part from a single manufacturer up to multiple families of part types. Many variations exist, depending on at least the nature of the shredding operation. Plastics from more than one source of durable goods may be including in the mix of materials fed to a plastics recycling plant. This means that a very broad range of plastics may be included in the feed mixture.

Some of the prevalent primary polymer types in the waste plastic materials are ABS, HIPS, PP, and PC. ABS is an impact modified styrene acrylonitrile copolymer of at least one alkenylaromatic monomer, at least one of acrylonitrile and methacrylonitrile and at least one aliphatic diene or rubber. See for example, "ABS Resins", Kirk-Othmer Encyclopedia of Chemical Technology, Third Edition, Volume 18, John Wiley & Sons, pages 442-449 (1982), for a description of ABS Resins and their method of manufacture. Suitable alkenylaromatic compounds include, for example, styrene and its analogs, such as 2-methyl styrene, chloro- and bromostyrenes, 3,5 di-methylstyrene and t-butylstyrene. The aliphatic dienes include butadiene, isoprene or chloroprene. These ABS polymers may be prepared by methods such as, emulsion, bulk and melt polymerization. A common method for preparing such polymers includes a first step of polymerizing the diene monomer or monomers to form a latex, and subsequent grafting the alkenylaromatic and nitrile monomers and any other monomers onto said latex, also while the latex is in emulsion.

HIPS is an impact modified styrene copolymer of at least one alkenylaromatic monomer and at least one aliphatic diene or rubber. See for example, "HIPS Resins", Kirk-Othmer Encyclopedia of Chemical Technology, Third Edition, Volume 18, John Wiley & Sons, pages 442-449 (1982) for a description of HIPS Resins and their method of manufacture. Suitable alkenylaromatic compounds include, for example, styrene and its analogs, such as 2-methyl styrene, chloro- and bromostyrenes, 3,5 di-methylstyrene and t-butylstyrene. The aliphatic dienes include butadiene, isoprene or chloroprene. In addition, some HIPS copolymers may contain a small amount of acrylonitrile to improve the environmental stress crack resistance for certain applications. These HIPS polymers may be prepared by methods similar to those used to prepare ABS polymers.

PP is a homopolymer or copolymer of propylene. See for example, Dorininghaus, Plastics for Engineers, Hanser, 1988, Chapter 4, for a description of PP Resins and their method of manufacture. Homopolymer polypropylene is typically isotactic, although syndiotactic and atactic forms are also produced. Propylene copolymers include semicrystalline block copolymers of propylene with ethylene, 1-butene, or higher a-olefins, semicrystalline sequential block copolymers of propylene, ethylene and a diene or amorphous statistical copolymers of propylene, ethylene and a diene. The diene can be 1,4-hexadiene, dicyclopentadiene or 3,5-ethylidene norbomene. Copoloymers including a diene are known as EPDM. Blends of homopolymer PP with EPDM are also considered part of the PP family.

PC is a condensation polymer consisting of the carbonate functional group (—O—CO—O—) separated by aromatic groups along the polymer chain. Variations in the chemical structure of monomers or end groups may be employed to alter the properties of the PC product. See for example, Domininghaus, Plastics for Engineers, Hanser, 1988, Chapter 14, for a description of PC Resins and their method of manufacture.

Other plastics, such as styrene/acrylonitrile copolymers (SAN), polystyrene (PS), polyethylene (PE), polyamides (PA, also known as nylons), polyvinyl chloride (PVC), blends of polyphenylene ether with HIPS, PC or PA (PPO, or modified PPO), polyphenylene ethers, polyethylene terephthalate, and polybutylene terephthaltate, can also be found in waste plastic streams.

Other polymers that are used to make plastic products may also be present in the waste plastic material. Further, multiple colors and grades of ABS and HIPS, flame retardant ABS and HIPS, PP, PC, PC/ABS, polyethylene, polyesters, nylons and other plastics can be contained in the feed material to a plastics recycling plant.

SUMMARY

The invention provides techniques for creating a thermoplastic resin from plastic materials. In general, in one aspect, the invention provides recycled thermoplastic resins. The resins comprise about 20 to about 99.9 parts by weight of one or more polymers of a primary polymer type, about 0.1 to about 40 parts by weight of residual additives, and one or more polymers of one or more secondary polymer types that are dissimilar to the primary polymer type. The one or more polymers of secondary polymer types include one or more of from 0 to about 79 parts by weight of one or more polymers of one or more secondary polymer types that are compatible with the first polymer type and/or from 0 to about 40 parts by weight of one or more polymers of one or more second polymer types that are incompatible with the first polymer type.

Particular embodiments can include one or more of the following features. The polymers of the primary polymer type and/or the secondary polymer types can include two or more grades of polymers. The two or more grades of polymers can be characterized by different molecular weights, different molecular composition or different polymer structure. The two or more grades of the polymers can be derived from different manufacturers. One or more of the polymers of the primary and/or secondary polymer types can exhibit detectible oxidation resulting from aging.

The residual additives can include bromine and antimony, where the ratio of bromine to antimony is between about 1:1 and 10:1, and the bromine and the antimony are present at combined levels of about 1 ppm to about 5% by weight. The residual additives can include titanium dioxide at levels between about 0.5% by weight and about 5% by weight. The residual additives can include carbon black at levels between about 0.1% by weight and about 3% by weight. The residual additives include one or more additional pigments or organic dye colorants at levels between about 1 ppm by weight and about 0.1% by weight. The residual additives can include two or more elements selected from the group consisting of Cd, Pb, Hg, Cr and Ni, the elements being present at levels between about 0.1 ppm and 100 ppm. The residual additives can include one or more additives selected from the group consisting of antioxidants, heat stabilizers, UV stabilizers, flame retardants, antistatics, blowing agents, impact modifiers, compatibilizers, fillers, fiber reinforcements, fluorescent whiteners, and lubricants. The residual additives can include two or more inconsistent or incompatible residual additives.

The compatible and/or incompatible dissimilar polymers can be included in the product composition in controlled amounts to meet user selected property requirements. The aging of the primary polymer type and/or the secondary polymer types can be detectible by infrared spectroscopy. The one or more polymers of the primary polymer type can include an impact modified styrene acrylonitrile copolymer that comprises about 80 to about 99 parts by weight of the resin. A first polymer of the one or more secondary polymer types is a styrene acrylonitrile copolymer that comprises about 0 to about 19 parts by weight of the resin. The residual additives can comprise about 2 to about 7 parts by weight of the resin. A second polymer of the one or more secondary polymer types can comprise about 0 to about 7 parts by weight of the resin.

The resin can include a rubber comprising between about 5% by weight and 30% by weight of the resin and has a glass transition temperature between about 105° C. and about 110° C. The rubber can include a butadiene polymer rubber. The first or second polymer of the one or more secondary polymer types can be a high impact polystyrene, a general purpose polystyrene, a polyolefin, a polyurethane, a nylons, a polyphenylene ether, a polycarbonate, a polyethylene terephthalate or a polybutylene terephthalate. The resin can have the following properties: a density of about 1.06 to about 1.10 grams per cubic centimeter, as determined by ASTM D 792; a melt flow rate of about 2 to about 9 grams per 10 minutes, as determined by ASTM D 1238; a tensile stress at yield of about 36 to about 48 MPa, as determined by ASTM D 638; and a notched Izod impact (3.2 mm notch) of about 85 to about 200 Joules per meter, as determined by ASTM D 256.

One or more of the polymers of the primary or secondary polymer types can be an impact modified styrene acrylonitrile copolymer, a blend of polycarbonate with an impact modified styrene acrylonitrile copolymer, a copolymer blend of styrene acrylonitrile and acrylate polymers, a polysulfone, a copolymer of styrene and acrylonitrile, polycarbonate, polyvinyl chloride, or polyurethane. A second polymer of the one or more secondary polymer types can include polystyrene, an impact modified polystyrene, a polyolefin, a polyurethane, a nylon, polyphenylene ether, polycarbonate, polyethylene terephthalate or polybutylene terephthalate. At least one polymer of the one or more primary polymer types can be an impact modified styrene acrylonitrile copolymer. At least one polymer of the one or more secondary polymer types can be a HIPS polymer, where the HIPS polmer is present in the resin in a substantial amount to achieve a user selected notched izod impact strength.

The one or more polymers of the primary polymer type can include an impact modified styrene polymer that comprises about 70 to about 99 parts by weight of the resin. A first polymer of the one or more secondary polymer types can be a general purpose polystyrene that comprises about 0 to about 10 parts by weight of the resin. The residual additives can comprise about 1 to about 5 parts by weight of the resin. A second polymer of the one or more secondary polymer types can comprises 0 to about 7 parts by weight of the resin. The resin can include between about 8% by weight and 16% by weight of a rubber and have a glass transition temperature between about 96° C. and about 100° C. The rubber can include a butadiene polymer rubber.

The second polymer of the one or more secondary polymer types can be an acrylonitrile butadiene styrene terpolymer, polyolefin, polyurethane, a nylon, polyphenylene ether, or polycarbonate. The resin can include a styrene portion of the polymer having a degradation temperature between about 400° C. and 405° C. The resin can have the following properties: a density of about 1.04 to about 1.08 grams per cubic centimeter, as determined by ASTM D 792; a melt flow rate of about 2 to about 8 grams per 10 minutes, as determined by ASTM D 1238; a tensile stress at yield of about 20 to about 27 MPa, as determined by ASTM D 638; and a notched Izod impact of about 60 to about 120 Joules per meter, as determined by ASTM D 256.

The one or more polymers of the primary polymer type can include a polypropylene that comprises about 88 to about 99 parts by weight of the resin. A first polymer of the one or more secondary polymer types can comprise 0 to about 5 parts by weight of the resin. The residual additives can comprise about 1 to about 5 parts by weight of the resin. A second polymer of the one or more secondary polymer types can comprise 0 to about 7 parts by weight of the resin. The resin has distinct melting points at about 125° C. and at about 164° C. and crystallization temperatures at about 110° C. and at about 130° C.

The polymers of the one or more secondary polymer types can include an acrylonitrile butadiene styrene terpolymers, polystyrene, an impact modified polystyrene, or polyethylene. The resin can have a degradation temperature of about 430° C. The resin can have the following properties: a density of about 0.92 to about 0.96 grams per cubic centimeter, as determined by ASTM D 792; a melt flow rate of about 20 to about 30 grams per 10 minutes, as determined by ASTM D 1238; a tensile stress at yield of about 20 to about 28 MPa, as determined by ASTM D 638; and a notched Izod impact (3.2 mm notch) of about 50 to about 100 Joules per meter, as determined by ASTM D 256.

The one or more polymers of the primary polymer type can include a polycarbonate that comprises about 20 to about 98 parts by weight of the resin. A first polymer of the one or more secondary polymer types can comprise 0 to about 93 parts by weight of an impact modified styrene acrylonitrile copolymer. The residual additives can comprise about 2 to about 10 parts by weight of the resin. A second polymer of the one or more secondary polymer types can comprise 0 to about 10 parts by weight of the resin. The resin can have distinct melting points at about 125° C. and at about 164° C. and crystallization temperatures at about 110° C. and at about 130° C.

The resin can be in the form of a flake having a size of about 1 mm to about 8 mm. The can be recovered from a waste plastic material derived from one or more post consumer sources selected from the group consisting of office automation equipment, white goods, consumer electronics, automotive shredder residue, packaging waste, household waste and building waste and post industrial molding and extrusion scrap.

In general, in another aspect, the invention provides products prepared from any of the resins described above. The products can be in the form of, for example, pellets or sheets extruded from the resins.

In general, in another aspect, the invention provides plastic articles prepared from the resins described above. The articles can be prepared, for example, by the co-extrusion of the resins described above with polymers such as impact modified styrene acrylonitrile copolymer, blends of polycarbonate with an impact modified styrene acrylonitrile copolymer, copolymer blends of styrene acrylonitrile and acrylate polymers, polysulfone, copolymers of styrene and acrylonitrile, polycarbonate, polyvinyl chloride, polyurethane, high impact styrene copolymers and polyolefins.

In general, in another aspect, the invention provides methods of preparing recycled thermoplastic materials. The methods include selecting one or more waste plastic materials based on the sources of the waste plastic materials, and combining the selected waste plastic materials to achieve a recycled plastic material having one or more predetermined properties.

Particular implementations can include one or more of the following features. Selecting one or more waste plastic materials can include selecting waste plastic materials based on a geographic source. The geographic source can be a country or region of product production—for example, North America, Europe, or Asia.

Selecting waste plastic materials can include selecting a waste plastic material from a source consisting of office automation equipment, white goods, consumer electronics, automotive shredder residue, packaging waste, household waste and building waste and post industrial molding and extrusion scrap. Selecting waste plastic materials can include selecting one or more waste plastic materials to yield a recycled plastic material comprising about 20 to about 99.9 parts by weight of polymer of a primary polymer type, about 0.1 to about 40 parts by weight of residual additives, and 0 to about 79 parts by weight of one or more polymers of one or more secondary polymer types that are compatible with and dissimilar from the primary polymer, and 0 to about 40 parts by weight of one or more polymers from one or more secondary polymer types that are incompatible with and dissimilar from the primary polymer type.

In general, in another aspect, the invention provides methods for preparing recycled plastic materials. The methods include providing waste plastic material, separating the waste plastic material into a plurality of homogenous plastic materials, determining amounts of at least one of the plurality of homogenous plastic materials and at least one other plastic material to provide one or more predetermined properties of a recycled plastic material, and combining the at least one of the plurality of homogenous plastic materials and the at least one other plastic material in the determined amounts to provide a recycled plastic material.

Particular implementations can include one or more of the following features. The at least one other plastic material can be selected from the plurality of homogenous plastic materials. The at least one other plastic material can be a virgin plastic material. At least two of the homogenous plastic materials can include a different primary polymer type. At least two of the homogenous plastic materials can include the same primary polymer type and can be distinguishable from one another based on one or more properties of the homogenous plastic material. The homogeneity of the homogenous plastic materials can be determined at least in part by the source of the waste plastic material. The homogeneity of the homogenous plastic materials can be determined at least in part by a separating process used to separate the waste plastic material. The methods can include compounding an additive or a polymer with the recycled plastic material. Determining amounts can include determining amounts of a first type of ABS material and a second type of ABS material that can be combined to form a recycled plastic material having a notched izod impact strength higher than the notched izod impact strength of the first type of ABS. Determining amounts can include determining amounts of a first type of ABS material and a second type of ABS material that can be combined to form a recycled plastic material having a notched izod impact strength higher than the notched izod impact strength of either the first type of ABS material or the second type of ABS material. Determining amounts can include determining amounts of an ABS material and a HIPS material that can be combined to form a recycled plastic material having an increased tensile strength relative to a tensile strength of the HIPS material. Determining amounts can include determining amounts of a modified PPO material and a HIPS material that can be combined to form a recycled plastic material having an increased notched izod impact strength and tensile strength and decreased melt flow rate relative to the HIPS material. Determining amounts can include determining amounts of an ABS material and a PC material that can be combined to form a recycled plastic material having an increased notched izod impact strength and tensile strength relative to the ABS material. Determining amounts can include determining amounts of an ABS material and a regrind flame retarded PC material that can be combined to form a recycled plastic material having an increased tensile strength relative to the ABS material. Determining amounts can include determining amounts of an ABS material and a PC/ABS material that can be combined to form a recycled plastic material having an increased notched izod impact strength and tensile strength relative to the ABS material. Determining amounts can include determining amounts grades of ABS materials to form a recycled plastic material with a predetermined SAN content. The predetermined SAN content can be sufficient to achieve one or more predetermined property, the properties including one of environmental stress crack resistance, tensile strength, impact strength, melt flow rate of the recycled plastic material.

In general, in another aspect, the invention provides methods of preparing plastic materials. The methods include a resin as described above with one or more polymers of a tertiary polymer type, where the polymers of the tertiary polymer type comprise between less than 1 part by weight to more than 99 parts by weight of the plastic material and the polymers of the tertiary polymer type are compatible with the resin.

Particular implementations can include one or more of the following features. The polymers of the primary polymer type can include polypropylene and the polymers of the tertiary polymer type include a polypropylene, a low density polyethylene or another polymer with which polypropylene is compatible. The polymers of the primary polymer type can include polycarbonate and the polymers of the tertiary polymer type include a polycarbonate, PC/ABS, a acrylonitrile butadiene styrene terpolymer, an acrylonitrile styrene acrylate copolymer or another polymer with which polycarbonate is compatible. The polymers of the primary polymer type can include HIPS and the polymers of the tertiary polymer type include an impact modified styrene polymer, a general purpose polystyrene, a modified polyphenylene ether or another polymer with which HIPS is compatible.

In general, in another aspect, the invention provides recycled thermoplastic resins having unique measurable characteristics. The recycled thermoplastic resins include about 20 to about 99.9 parts by weight of a first polymer type, about 0.1 to about 40 parts by weight of one or more residual additives, 0 to about 79 parts by weight of compatible dissimilar polymers, and 0 to about 40 parts by weight of incompatible dissimilar polymers. The first polymer type can include two or more grades of polymer, such as polymers with different molecular weights, composition, or rubber morphology, or polymers from different manufacturers. The compatible dissimilar polymers and/or the incompatible dissimilar polymers can be of one or more polymer types, and/or can include one or more grades of each polymer type. One or more of the components can exhibit aging due to oxidation as detected by FTIR.

Particular embodiments can include one or more of the following features. The residual additives can include bromine and/or antimony. The ratio of bromine to antimony can be in the range from about 1:1 to about 10:1. Bromine and antimony can be present in combined amounts in the range from about 1 ppm to about 5% by weight. The residual additives can include $TiO_2$ at levels between about 0.5% by weight and about 5% by weight. The residual additives can include carbon black at levels between about 0.1% by weight and about 3% by weight. The residual additives can include one or more additional pigments or organic dye colorants at levels between about 1 ppm by weight and about 0.1% by weight. The residual additives can include two or more of elements selected from Cd, Pb, Hg, Cr and Ni at levels between about 0.1 ppm and 100 ppm. The residual additives can include one or more additives selected from antioxidants, heat stabilizers, UV stabilizers, flame retardants, antistatics, blowing agents, impact modifiers, compatibilizers, fillers, fiber reinforcements, fluorescent whiteners, and lubricants. The residual additives can include mixtures of two or more of these. The residual additives can be present in the recycled plastic material in detectable amounts sufficient to identify the resin as being derived from waste plastic material. The residual additives can include five or more, 10 or more, 15 or more, 20 or more, or 30 or more different residual additives. The residual additives can include detectable amounts of two or more inconsistent or incompatible compounds.

The dissimilar polymers can be included in the recycled thermoplastic resin in controlled amounts to meet property requirements. The recycled thermoplastic resin can contain aged plastics in amounts identifiable using techniques such as infared spectroscopy. The recycled thermoplastic resin can be manufactured in such a way that there are environmental benefits compared with the manufacture of similar virgin resins. The recycled thermoplastic resin can have a uniform and homogeneous composition. The recycled thermoplastic resin can have uniform properties. The recycled thermoplastic resin can include plastics are derived from post consumer sources including one or more of office automation equipment, white goods, consumer electronics, automotive shredder residue, packaging waste, household waste and building waste and post industrial molding and extrusion scrap. The recycled thermoplastic resin can include plastics derived from post consumer sources in one or more of North America, Europe, or Asia or a combination of these regions. The recycled thermoplastic resin can be in the form of flake of mixed origin having a size of about 1 mm to about 8 mm.

The recycled thermoplastic resin can include from about 80 to about 98 parts by weight of an impact modified styrene acrylonitrile copolymer, from about 0 to about 19 parts by weight of styrene acrylonitrile copolymer, from about 2 to about 7 parts by weight of one or more additives selected from antioxidants, heat stabilizers, UV stabilizers, flame retardants, antistatics, blowing agents, impact modifiers, compatibilizers, fillers, fiber reinforcements, fluorescent whiteners, pigments, organic colorants, carbon black and lubricants, and from about 0 to about 7 parts by weight of at least one additional polymer. The additional polymers can include a polymer selected from high impact polystyrene, general purpose polystyrene, polyolefin, polyurethane, nylons, polyphenylene ether, and polycarbonate. The recycled thermoplastic material can have a rubber content between about 5% by weight and 30% by weight and a glass transition temperature between about 105° C. and about 110° C.

The ABS containing recycled thermoplastic resin can have a density of about 1.06 to about 1.10 grams per cubic centimeter, as determined by ASTM D 792, a melt flow rate of about 2 to about 9 grams per 10 minutes, as determined by ASTM D 1238, a tensile stress at yield of about 36 to about 48 MPa, as determined by ASTM D 638, and a notched Izod impact (3.2 mm notch) of about 85 to about 200 Joules per meter, as determined by ASTM D 256.

The recycled thermoplastic resin can include from about 80 to about 98 parts by weight of an impact modified styrene polymer, from about 0 to about 19 parts by weight of general purpose polystyrene, from about 1 to about 7 parts by weight of one or more additives selected from antioxidants, heat stabilizers, UV stabilizers, flame retardants, antistatics, blowing agents, impact modifiers, compatibilizers, fillers, fiber reinforcements, fluorescent whiteners, pigments, organic colorants, carbon black and lubricants, and from about 0 to about 7 parts by weight of at least one additional polymer. The additional polymer can include a polymer selected from acrylonitrile butadiene styrene terpolymers, polyolefin, polyurethane, nylons, polyphenylene ether, and polycarbonate. The recycled thermoplastic material can have a rubber content of between about 4% by weight and 20% by weight and a glass transition temperature between about 96° C. and about 100° C. The recycled thermoplastic resin can have a polystyrene degradation temperature between about 400° C. and 415° C.

The HIPS containing recycled thermoplastic resin can have a density of about 1.04 to about 1.08 grams per cubic centimeter, as determined by ASTM D 792, a melt flow rate of about 2 to about 9 grams per 10 minutes, as determined by ASTM D 1238, a tensile stress at yield of about 20 to about 27 MPa, as determined by ASTM D 638, and a notched Izod impact (3.2 mm notch) of about 60 to about 120 Joules per meter, as determined by ASTM D 256.

The recycled thermoplastic resin can include from about 90 to about 98 parts by weight of polypropylene, from about 2 to about 7 parts by weight of one or more additives selected from antioxidants, heat stabilizers, UV stabilizers, flame retardants, antistatics, blowing agents, impact modifiers, compatibilizers, fillers, fiber reinforcements, fluorescent whiteners, pigments, organic colorants, carbon black and lubricants, and from about 0 to about 5 parts by weight of at least one additional polymer. The additional polymer can include a polymer selected from acrylonitrile butadiene styrene terpolymers, polystyrene, impact modified polystyrene, and polyethylene. The recycled thermoplastic resin can have distinct melting points at about 125° C. and at about 164° C., distinct crystallization temperatures at about 110° C. and at about 130° C. and a degradation temperature of about 430° C.

The PP containing recycled thermoplastic resin can have a density of about 0.92 to about 0.96 grams per cubic centimeter, as determined by ASTM D 792, a melt flow rate of about 20 to about 30 grams per 10 minutes, as determined by ASTM D 1238, a tensile stress at yield of about 20 to about 28 MPa, as determined by ASTM D 638, and a notched Izod impact (3.2 mm notch) of about 50 to about 100 Joules per meter, as determined by ASTM D 256.

The recycled thermoplastic resin can include from about 20 to about 98 parts by weight of polycarbonate, from 0 to about 93 parts by weight of an impact modified styrene acrylonitrile copolymer, from about 2 to about 10 parts by weight of one or more additives selected from antioxidants, heat stabilizers, UV stabilizers, flame retardants, antistatics, blowing agents, impact modifiers, compatibilizers, fillers, fiber reinforcements, fluorescent whiteners, pigments, organic colorants, carbon black and lubricants, and from 0 to about 10 parts by weight of at least one additional polymer. The additional polymer can include a polymer selected from polystyrene, impact modified polystyrene, polyolefin, polyurethane, nylons, and polyphenylene ether.

The amounts of different grades of the polymers in the recycled thermoplastic resin can be controlled by the selection of appropriate separation processes and parameters of separation, by combining products from distinct separation processes and/or separation parameters, by selecting appropriate source materials, by combining products obtained from separating different source materials, by combining products from multiple runs of material through the same separation process and separation parameters, by selecting sources of material by geographic location, by selecting sources of material by the date which the original plastic material was produced, or by combining recycled plastic with virgin plastic of the same type.

The amounts of dissimilar polymers in the recycled thermoplastic resin can be controlled by the selection of appropriate separation processes and parameters of separation, by combining products from distinct separation processes and/or separation parameters, by selecting appropriate source materials, by combining products from multiple runs of material through the same separation process and separation parameters, or by combining with other virgin or recycled products in known amounts.

The melt flow rate, impact strength, tensile strength, environmental stress crack resistance and other properties of the recycled thermoplastic resin can be determined by the amounts of different grades of ABS, HPS, or PP materials in the recycled thermoplastic resin. The melt flow rate, impact strength, tensile strength, environmental stress crack resistance and other properties of a recycled ABS material can be determined by the amount of SAN, HIPS, or PC in the recycled ABS material. The melt flow rate, impact strength, tensile strength, environmental stress crack resistance and other properties of a recycled HIPS material can be determined by the amount of general purpose PS, modified PPO, ABS, or PP in the recycled HIPS material.

Particular embodiments can include one or more of the following features. The compositions can include from less than 1 to greater than 99 weight percent of a compatible virgin or recycled polymer and greater than 99 to less than 1 weight percent of the recycled thermoplastic material. When the recycled thermoplastic material is ABS material, the virgin or recycled polymer can be selected from ABS, blends of PC with an ABS, copolymer blends of styrene acrylonitrile and acrylate polymers, polysulfone, copolymers of styrene and acrylonitrile, PC, PVC, and polyurethane. When the recycled material is HIPS, the virgin or recycled polymer can include a polymer selected from ABS, general purpose PS, modified polyphenylene ethers, and other polymers with which HIPS is compatible. When the recycled thermoplastic material is PP material, the virgin or recycled polymer includes a polymer selected from PP, low density PE, and other polymers with which PP is compatible. When the recycled material is PC, the virgin or recycled polymer can include a polymer selected from PC, PC/ABS, acrylonitrile butadiene styrene terpolymer, acrylonitrile styrene acrylate copolymer and other polymers with which polycarbonate is compatible.

The composition can be a stabilized plastic composition including the recycled thermoplastic resin and one or more additives selected from antioxidants, heat stabilizers, and UV stabilizers. The composition can be in the form of a pellet or sheet extruded from the recycled thermoplastic resin.

In general, in another aspect, the invention provides formable plastic compositions including recycled thermoplastic resins as described above.

In general, in another aspect, the invention provides articles prepared by the co-extrusion of one or more of the recycled thermoplastic resins described above and one or more polymers selected from the group consisting of impact modified styrene acrylonitrile copolymer, blends of polycarbonate with an impact modified styrene acrylonitrile copolymer, copolymer blends of styrene acrylonitrile and acrylate polymers, polysulfone, copolymers of styrene and acrylonitrile, polycarbonate, polyvinyl chloride, polyurethane, high impact styrene copolymers and polyolefin.

The invention can be implemented to provide one or more of the following advantages. The compositions of the invention can be derived from a wide variety of feed sources. A number of grades containing a wide variety of additives can be incorporated into a single recycled plastic material. Products can be prepared from the compositions of the invention using less petroleum and energy than is generally required to create virgin plastics from petroleum. The compositions can include a variety of additives that can provide improved properties for some types of recycled plastic material uses. Compositions can be prepared with material properties that differ from comparable virgin materials, including density, melt flow rate, tensile stress at yield, and notched izod impact strength. For example, the production of compositions having melt flow rates between those of extrusion grade plastic and injection grade plastic yields compositions that can be effective as interior plastics in coinjection molding applications. The slightly higher viscosity of the interior plastic relative to the exterior plastic should lead to a more uniform exterior layer, with the result that the interior plastic can be used in a larger amount and in more complicated parts than would a material with a melt flow rate higher than that of the exterior plastic. The compositions can exhibit good environmental stress crack resistance properties. Blending some grades of polymers together results in plastic materials with higher impact strength than that of the polymer grades individually. Particular properties can be selected for based on the selection of waste plastic materials or other additions to the recycled plastic material.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is an FTIR absorbance spectrum of exemplary mixed and thin ABS materials.

FIG. 3 is a graph of the dynamic shear moduli for exemplary mixed and thin ABS materials at 200° C.

FIG. 4 is an AFM image of an exemplary mixed ABS material.

FIG. 5 shows the dynamic high resolution TGA of exemplary U.S. refrigerator samples.

FIG. 6 shows the dynamic high resolution TGA and DTGA of an exemplary U.S. refrigerator sample, showing the SAN degradation temperature, rubber content and pigment loading.

FIG. 7 demonstrates the loss modulus (E") and tan δ for exemplary ABS materials derived from U.S. and Japanese sources.

FIG. 8 is a plot of the retention of tensile strength for exemplary ABS samples exposed to olive oil for 72 hours.

FIG. 9 is a HPLC Chromatogram of an exemplary ABS material derived from Japanese white goods.

FIG. 10 is a plot of the melt flow rate (220/10.0) as a function of composition of exemplary ABS materials.

FIG. 11 shows the XRF spectra of a virgin ABS and an exemplary ABS from office automation equipment.

FIG. 12 is a schematic diagram of a scheme for compounding ABS materials having various melt flow rates to provide a recycled ABS material having a consistent melt flow rate.

FIG. 13 demonstrates the loss modulus (E") and tan δ for exemplary HIPS materials derived from Japanese and U.S. sources.

FIG. 14 is a HPLC chromatogram of a solution extracted from an exemplary HIPS material from Japanese white goods.

FIG. 15 shows the melt flow rate consistency of various lots of recycled HIPS material.

FIG. 16 is a graph of a cooling thermogram showing the crystallization temperatures and enthalpies for an exemplary PP sample.

Figure 1:
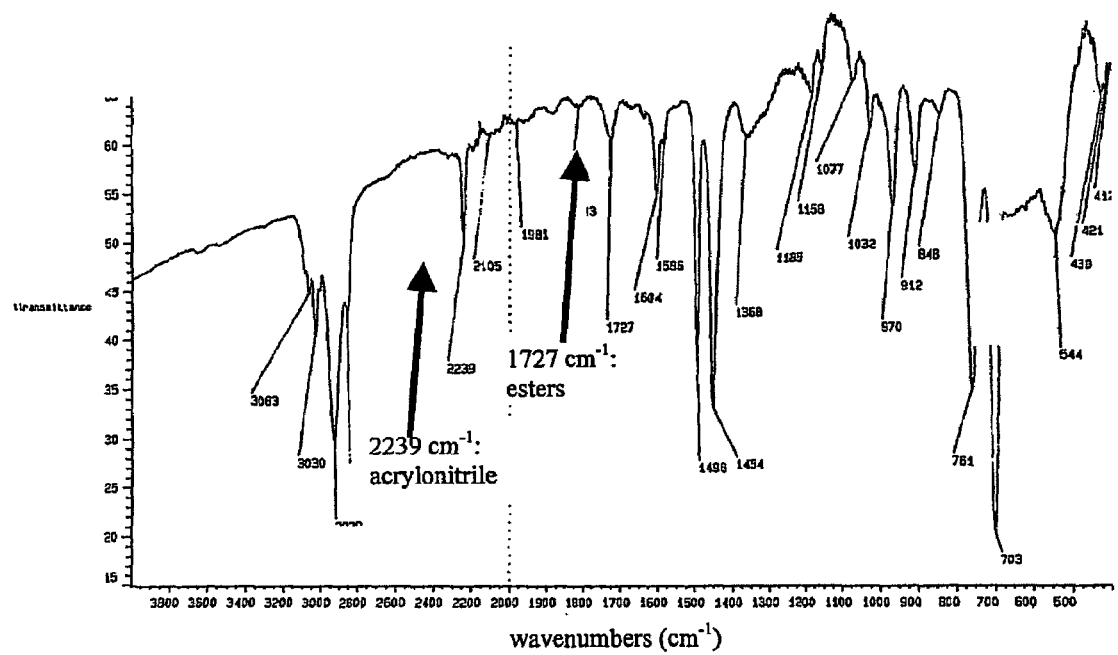
FIG. 1 is an FTIR transmission spectrum of an exemplary mixed ABS material according to one aspect of the invention.

The details of one or more embodiments of the invention are set forth in the accompanying drawings and the description below. Other features, objects, and advantages of the invention will be apparent from the description and drawings, and from the claims.

DETAILED DESCRIPTION

The invention provides recycled thermoplastic materials having unique measurable characteristics. The recycled thermoplastic materials of the invention can be prepared from a mixture of different grades of a primary polymer type. In addition, the materials can include residual additives. Alternatively or additionally, the materials can include multiple compatible or incompatible dissimilar polymers. Further, the materials can include any combination of these components.

As used in this specification, a primary polymer type is a polymer that characterizes a plastic. For example, an ABS material has ABS as its primary polymer. The polymer type indicates that the polymers are related by their linked molecular components. For example, ABS polymers are copolymers of styrene and acrylonitrile and HIPS polymers contain polystyrene. Each of the primary polymer types can be available in various grades. The grades can be characterized by different molecular weights, different molecular composition or different polymer structure or morphology. The variety of molecular weights of the primary polymer type, along with the other components of a material, give the material its characteristic properties. Generally, the primary polymer of extrusion grade ABS plastic has an average molecular weight that is higher than the average molecular weight of the primary polymer of injection grade ABS plastic even though the primary polymer of each ABS plastic is a type of ABS polymer. Along with other factors, the molecular weight affects the melt flow rate and viscosity of the material.

One or more additives can be incorporated into the materials to improve a property or properties of the recycled plastic material. Additives used in the materials of the invention can include, but are not limited to, antioxidants, heat stabilizers, UV stabilizers, flame retardants, antistatics, blowing agents, impact modifiers, compatibilizers, fillers, fiber reinforcements, fluorescent whiteners, pigments, organic colorants, carbon black, titanium dioxide, and lubricants. Each class of additives can include a diverse array of additive types.

For example, antioxidants typically include both primary, which are typically hindered phenols, and secondary antioxidants, which are typically phosphates. Since there are several types of both primary and secondary antioxidants that are useful in different applications, there can be a broad variety of antioxidants in any given recycled plastic material. Residual antioxidants can include, for example, alkylphenols, hydroxyphenylpropionates, hydroxybenzyl compounds, alkylidene bisphenols, secondary aromatic amines, thiobisphenols, aminophenols, thioethers, phosphates, phosphonites and others (see, e.g., F. Gugumus, "Chapter 1: Antioxidants" in Plastics Additives Handbook, 4th Edition, Hanser Publishers, 1996.). There are multiple chemical types in each of these antioxidant families.

UV (or light) stabilizers can include UV absorbers, hindered amine light stabilizers, certain nickel containing compounds and others. (see, e.g., F. Gugumus, "Chapter 3: Light Stabilizers" in Plastics Additives Handbook, 4th Edition, Hanser Publishers, 1996.). Again, there are multiple chemical types in each of these families.

Flame retardants can include brominated flame retardants, chlorinated flame retardants, antimony trioxide, phosphorous-containing flame retardants, aluminum hydroxide, boron-containing compounds and others. (see, e.g., H. J. Troitzsch, "Chapter 12: Flame Retardants" in Plastics Additives Handbook, 4th Edition, Hanser Publishers, 1996.). There are multiple chemical types of brominated flame retardants, chlorinated flame retardants and phosphorous-containing flame retardants. Bromine and antimony-containing flame retardants are commonly used, and often appear in particular ratios and at particular levels in plastic products where flame retardant characteristics are desired. For example, in typical products, the ratio of bromine to antimony can be in the range of from about 1:1 to about 10:1, and the bromine and the antimony can be present at combined levels of about 1 ppm to about 5% by weight.

Flame retardant compounds are used in some types of plastics in quantities sufficient to impart flame retardant properties to the plastic (which can make the plastic eligible for a UL V-0, V-1, or V-2 rating). Waste plastic materials can include both flame retardant and non-flame retardant plastics. As a result, at least trace amounts of Sb and Br are typically present and detectable in recycled plastic material derived from such waste streams. The presence of trace amounts of antimony and/or bromine can therefore be used as a marker to indicate that a particular material is derived from plastics recovered from a post consumer source. While the levels of antimony and/or bromine may not be high enough to render a recycled plastic material flame retardant, they may be high enough to impart some flame resistance to the recycled plastic material that is sufficient to achieve a UL HB rating, which can otherwise be difficult to achieve when the plastic is molded at a particular thickness. The presence of other flame retardants can similarly serve to identify materials derived from post-consumer sources. For example, antimony trioxide and phosphorous-based FRs can be antagonistic in their flame retardant effect, making it unlikely they would be intentionally used together in a virgin material. As a result, the appearance of both types of compound in a plastic material can be a marker that the material is a product of a recycling process.

Impact modifiers or compatibilizers can be added to increase the toughness of the material. Such impact modifiers and compatibilizers include, for example, copolymers of styrene and diene rubber and copolymers of styrene and maleic anhydride.

The recycled plastic material can be compounded with fillers and reinforcements, which can enhance the material's mechanical and heat distortion properties. In general, any reinforcing filler can be used, such as fiberglass, asbestos, mica, wollastonite, talc, calcium carbonate, fly ash, clay, whiskers, metal flakes, ceramics and carbon filaments. When used, the filler will typically comprise about 5 to about 100 parts by weight per 100 parts by weight of the polymer.

Some additives can be included in the recycled plastic materials based on the color of the waste plastic material from which the material is derived, and/or the conditions (e.g., heat, light, chemicals) to which the waste plastic material was exposed. Often, titanium dioxide along with low levels of antioxidants and possibly optical brighteners are present in plastics. The titanium dioxide is used to make the plastic white, optical brighteners may be used to hide any yellowing, and antioxidants are used to prevent degradation during processing and over the life of the part. Mixtures of recycled plastics tend to have white plastics containing $TiO_2$ pigments and black plastics containing carbon black. In addition to white and black materials, waste plastic streams can include materials in a variety of other colors, such as blue, green, yellow and red, which contain a variety of pigments and dyes that give them their color. The presence of these pigments and dyes can be detected visually as color flakes in flake mixtures and with various analytical methods (e.g. spectrophotometry) in pellets or parts molded from pellets. The presence of this broad range of colorants can be a unique characteristic of plastic products manufactured from broadly mixed post-consumer sources. The compositional ranges of these colorants in the plastic products is relatively independent of the plastic type. $TiO_2$ pigments are typically found in the range from about 0.5 to about 5 percent by weight. Carbon black is typically found in the range from about 0.1 to about 3 percent by weight. Other color pigments and dyes are typically found in the range from about 1 ppm to about 0.1 percent by weight.

Lubricants can include metallic soaps, fatty acids and esters, hydrocarbon waxes, amide waxes and ester waxes (see, e.g., T. Riedel, "Chapter 6: Lubricants and Related Additives" in Plastics Additives Handbook, 4th Edition, Hanser Publishers, 1996.). There are multiple chemical types in each of these families.

Mixtures of recycled plastics also tend to contain a number of elements including, but not limited to, Cd, Pb, Hg, Cr and Ni, at levels between about 0.1 ppm and 100 ppm. The presence of two or more of these elements can be a unique characteristic of plastic products manufactured from broadly mixed post-consumer sources. In one embodiment, the recycled plastic materials of the invention can be compounded with additional antioxidants and stabilizers, such as, hindered phenols and phosphite stabilizers.

As described above, the presence in a material of particular additives or combinations of additives can serve as a marker that the material is derived from waste plastic sources. Because the compositions of the invention are generally produced from diverse sources of waste plastic materials, it is likely that they will include a broad spectrum of additives that would be unlikely to occur in virgin plastic materials. Therefore, particular embodiments of the compositions of the invention include five or more, 10 or more, 15 or more, 20 or more, or even 30 or more different residual additives (of the same or different classes).

In particular embodiments, the additives present in the compositions of the invention can include two or more compounds that would be expected to interact in ways that would produce undesirable results. For example, as discussed above, antimony trioxide and phosphorous-containing flame retardants would be expected to be antagonistic in their flame-retardant activity. Similarly, the combination of certain types of TiO2 with hindered amine light stabilizers or phenolic antioxidants leads to yellowing. Halogenated (e.g., Br and Cl) flame retardants can show reduced effectiveness in presence of calcium carbonate filler. Other additives that would be unlikely to be intentionally used together in a plastic material include hindered amine light stabilizers and thioesters, hindered amine light stabilizers and acidic carbon black, hindered amine light stabilizers and certain phenolic antioxidants, Irganox 1010 and hydrotalcite-based acid scavenger (DHT 4A), which leads to gray discoloration in PP, zinc stearate and erucamide, which are both lubricants, and mixtures of $TiO_2$ and carbon black, particularly in the presence of other color pigments or dyes, as discussed above. Similarly, the compositions of the invention can include additives that are incompatible with one or more of the polymers (e.g., the primary polymer) of the material, which would also be unlikely to be used in corresponding virgin materials.

As stated above, the recycled plastic materials can also include additional polymers, such as rubber. Different rubber morphologies can affect the environmental stress crack resistance of the materials as well as other properties. Other additional polymers can include dissimilar polymers from the primary plastic type, and virgin polymers similar to the primary polymer type. Dissimilar polymers do not fit within the defined compositional range of the primary polymer. Of the dissimilar polymers, there are polymers that are compatible with the primary polymer type—that is, the compatible polymers can be combined with the primary polymer in any proportion to yield good physical properties. In addition, compatible polymers can be miscible with the primary polymer or can be in a separate phase while still yielding a product with good properties. Conversely, incompatible polymers typically reduce the properties of the plastic due to poor adhesion between the polymer phases.

A grade of plastic is defined as a formulation of plastic material with a particular set of targeted physical characteristics or properties. The particular physical characteristics or properties of a grade are controlled by the chemical composition of the polymers in the grade, the average molecular weights and molecular-weight distributions of polymers in the grade, the rubber morphology for impact modified grades, and the group of additives in the grade.

Different grades of a given plastic type would generally be compatible. Grades can generally be melt mixed to create a new material with a different property profile.

Different plastic types, on the other hand, cannot generally be melt combined as easily unless the types happen to be compatible. Blending different plastic types, such as HIPS and ABS, is often avoided except in special situations.

Because recycled plastic products incorporate waste plastic materials that tend to have been exposed to the environment longer than virgin plastics, the recycled plastic materials can include compounds resulting from environmental degradation (e.g., oxidation) of compounds that were originally present in the waste plastic materials. This oxidation often can be detected by observing the bonds of the polymers. The additives in the plastic can also exhibit the effects of exposure to the environment. For example, antioxidants can be converted to different, often inactive, compounds after scavenging radicals.

The polymers and additives discussed above are often founds in blends of waste plastic materials. Generally, the compositions have properties that make them effective for use in a variety of thermoforming processes.

The principal plastic types contained in some typical feed sources in major (M) and minor (m) amounts are listed in Table 1. Feed sources are described by geography and product type.

TABLE 1

Abundance of Selected Plastics in Various Feed Streams (Major = M, minor = m)

| source | ABS | HIPS | PP | PC/ABS | PC | PPO | PS | SAN |
|---|---|---|---|---|---|---|---|---|
| U.S. white goods | M | M | M | m | m | m | M | M |
| European white goods | m | M | M | m | m | m | M | M |
| Japanese white goods | M | M | M | m | m | m | M | M |
| U.S. automotive | M | m | M | M | M | M | m | m |
| U.S. office automation | M | M | m | M | M | M | m | m |
| U.S. consumer electronics | M | M | m | M | M | M | m | m |

One of the primary sources of plastics is refrigerator parts. The two dominant plastics in refrigerators are ABS and HIPS. Some refrigerator parts are coextruded into two or more layers, which can include the same or different polymer types. Often, for example, the outer layers may include plastics chosen for their environmental stress crack resistance. A middle layer, which has a lower appearance and mechanical properties requirement, often contains regrind of materials used in the outer layers.

Other plastics such as SAN, general purpose PS, PC, PP, PE, PA and PVC are typically in refrigerators in lesser amounts.

The primary plastic found in washing machines is PP.

Plastics from automotive sources include, but are not limited to, ABS, HIPS, modified PPO, PC, PC/ABS, PA, PVC, polymethyl methacrylate (PMMA), blends of PC with polybutylene terephthalate (PC/PBT), and various polyolefins.

Plastics from office automation equipment include, but are not limited to, ABS, HIPS, modified PPO, PC, PC/ABS, PVC, polyacetals. Many of these plastics may be flame retarded to achieve flammability safety ratings for certain parts.

Plastics from consumer electronics include, but are not limited to, HIPS, modified PPO, ABS, PC/ABS and PC. Many of these plastics may be flame retarded to achieve flammability safety ratings for certain parts.

Waste plastic materials can be derived from post-consumer and post-industrial sources from around the world. Since different types of polymers (and different grades of the same polymer type) are used in different parts of the world, it is possible to tailor the recycling process to focus on a particular type of polymer by sorting the scrap according to location. For example, a recycling operation concentrated on scrap only from North America, only from Europe or only from Asia can be established—or geographical differences can be taken into account when combining scrap in order to alter the composition of the thermoplastic resin.

Time can also be considered in controlling the composition of the recycled plastic materials of the invention by separating and selecting waste product materials according to age. The type and grades of plastics used in products has changed over time due to factors such as economics, improvements in polymer properties and environmental legislation. For example, most refrigerators last for about ten to about twenty-five years, so any recycling of refrigerator parts is likely to cover parts made over about a ten to twenty-five year period. The types and grades of plastics used in refrigerators have changed significantly over the past twenty-five years in order to provide adequate environmental stress crack resistance in the presence of different blowing agents used in the polyurethane foam insulation. This variety of plastic types and grades from different time periods can be another factor in obtaining uniform properties for the recycled plastic material—the collection of recycled goods will typically cover more than just a one or two-year period.

Plastic from waste plastic materials can be separated by density. For white goods, the density of unfilled PP is below 1.00 g/cm$^3$ and the densities of ABS, HIPS, filled PP, SAN, PS, PC, PVC, nylon and others are above 1.00 g/cm$^3$. Thus, a dense media separation at about 1.12 g/cm$^3$ can isolate a fraction of material with densities between 1.00 and 1.12 g/cm$^3$ that includes mostly ABS, HIPS, filled PP, SAN and PS with lesser amounts of other plastics. A further dense media separation at about 1.24 g/cm$^3$ can isolate a fraction of material with densities between 1.12 and 1.24 g/cm$^3$ that includes PC, PC/ABS, nylon and flame retardant grades of ABS, HIPS, PC and PC/ABS, along with lesser amounts of other plastics.

The fraction with a density below 1.00 g/cm$^3$ for white goods includes mostly unfilled PP and PE as well as lesser amounts of higher density plastics (due to imperfect separation or voids in the higher density plastic). This fraction can be further separated using color sorting, thickness sorting and sorting by methods depending on a narrow surface to mass distribution (electrostatic separation and/or density differential alteration). The resulting PP product may be of high purity, but still may include small amounts of the other plastics as contaminants.

The material with densities between 1.00 and 1.12 g/cm$^3$ can be further separated—for example, using techniques described in Provisional Application No. 60/397,980, filed Jul. 22, 2002, Provisional Application No. 60/397,948, filed Jul. 22, 2002, and U.S. Pat. No. 6,452,126, each of which is incorporated by reference herein. The resulting ABS and HIPS products will achieve a purity based on the effectiveness of the separations. In most cases, purity will be less than 100%, with minority amounts of the other major and minor plastics.

The material with densities between about 1.12 and about 1.24 g/cm$^3$ can be further separated. The resulting flame retardant ABS, flame retardant HPS, and PC-containing products will achieve purities and compositions based on the effectiveness of the separations. In most cases, purity will be less than 100%, with minority amounts of the other major and minor plastics.

The separations used to recover the plastics typically yield small particles—flakes—between 1 and 8 mm in size. The recovery of smaller or slightly larger flakes is possible, although considerably larger flakes could limit the ability to process the material.

Waste plastic materials recovered from post consumer durable goods have very consistent properties due to the large degree of mixing of feed materials, the large scale of typical plastics recycling facilities and the method of manufacturing the product. These factors also contribute to the range of grades of the primary plastic that exists in the resulting mixture of recycled plastic materials. In addition, the additives found in each of the waste plastic materials are combined and homogenized into the resultant recycled plastic material. Once the waste plastic materials have been separated and are in flake form, the properties may differ on a per flake basis from one another. However, when the properties of the resultant recycled plastic material are taken across a bulk sampling of the flakes, the properties will typically be reasonably homogenous from sample to sample. The resultant recycled plastic material can be extruded into pellets using to known extrusion techniques. Pelletization eliminates the heterogeneity of the properties from flake to flake.

The mixture of components of the plastic material can be altered to achieve properties desirable for using the recycled plastic materials in a variety of thermoforming processes. One of the properties that affects the use of a virgin or recycled plastic material is the melt flow rate. As described above, the melt flow rate for an extrusion plastic is lower than for an injection plastic. Because of the combination of extrusion and injection plastics in waste plastic material, the resulting recycled plastic material generally has a melt flow rate in between extrusion and injection plastics. The intermediate melt flow rate can be an advantage for co-injection molding. Properties other than melt flow rate are similar controllable, as seen in the Examples below. One way of altering the properties is by selecting the feed source based on the composition of the recycled plastic material in the particular feed source. Another way of altering the composition of the resulting recycled plastic material is by compounding the recycled plastic material with selected components.

A recycled plastic material with predetermined properties can be created from waste plastic material in a process incorporating some or all of the following steps. Waste plastic material is derived from a waste source, such as discarded plastic products or scrap plastics remaining from an industrial source. Typically, the plastic parts and pieces are separated from any metal components and then shredded into small pieces. If there is no metal in the products, the plastics can simply be shredded. The small pieces or flakes are then separated using the techniques described above and in U.S. application Ser. No. _____, titled "Multistep Separation of Plastics" to Lawrence E. Allen, III, Brian L. Riise, Paul C. Allen, and Ron C. Rau, filed on Apr. 14, 2003, incorporated by reference above. Separation can be by plastic type, e.g. flakes of the same primary polymer, or by predetermined properties that are found in the separated flakes—for example, separating flakes of the same primary polymer and rich in another polymer. The amount of separation may depend on the purity of the input waste plastic material, on the desired properties of the recycled waste material, or on the particular separation processes used. Following separation processes, the recycled plastic material can be compounded with additives or polymers to achieve the desired properties.

Another way of creating a recycled plastic material with predetermined properties is by separating the waste plastic material prior to processing the plastic material into flakes. As described above, plastic products of a particular type or from a particular source are generally made from a single primary polymer type. Thus, selection and use of waste plastic materials by geographic source or type can result in relatively pure recycled plastic material. More than one recycled plastic material can be combined to create a recycled plastic material with desired properties. In one embodiment, the recycled plastic material can be compounded with virgin or recycled polymers. Wide ranges of amounts are possible, from about 1 to about 99 weight percent recycled plastic material and from about 99 to about 1 weight percent of the virgin polymer.

Various processes can be used for making parts and articles from the recycled plastic material, including sheet or profile extrusion molding, co-extrusion molding, injection molding, co-injection molding, along with other known processing techniques, such as blow molding and structural foam molding.

ABS Materials

In one aspect, the invention provides recycled plastic materials that contain predominately recycled ABS material. ABS is one of the major products resulting from the recycling of white goods or other streams of durable goods. The ABS materials obtained from recycling durable goods have compositions which are characteristic of the blend of feed material plastics. These compositions have a unique balance of properties and can be effectively used in a variety of thermoforming processes to produce value added articles.

The ABS materials typically include about 20 to about 99.9 parts by weight of an impact modified styrene acrylonitrile copolymer. The ABS materials typically also include 0 to 79 parts SAN. The ABS materials can also include from about 0.1 to about 25 parts by weight of other additives as described above. Typically, the ABS materials will include from about 0 to about 24 parts by weight of at least one additional polymer. In particular implementations, the materials include about 80 to 99 parts by weight of the impact modified styrene acrylonitrile copolymer, while SAN and additives are present from 0 to 19 parts by weight and from about 1 to about 7 parts by weight, respectively. In particular implementations additional polymers are present in the ABS materials in amounts ranging from 0 to about 7 parts by weight. The additional polymers can be selected from polymers including PS, HIPS, a polyolefin, a polyurethane, a nylon, polyphenylene ether, PC, polyethylene terephthalate or polybutylene terephthalate.

In one implementation, the recycled plastic material contains about 75 to 98 parts by weight ABS, about 1 to 10 parts by weight of or more additives, about 0 to about 24 parts by weight of at least one additional polymer and has a rubber content of between about 10% weight and 30% weight.

Table 2 shows relatively uniform properties the ABS materials exhibit. The broad range of densities results from the broad range of densities of the component ABS flakes. The density differences are primarily due to different pigment loadings, although small variations in rubber content and acrylonitrile content can also affect the density. As discussed above, the ABS materials can include SAN as an additional polymeric component in controlled levels. Varying the amount of SAN can control the rheological properties, such as the melt flow rate, in the ABS materials. The level of SAN can be important because other product properties can depend on the amount of SAN.

TABLE 2

| Property | Method | Units | Typical range | Preferred range |
| --- | --- | --- | --- | --- |
| density | ASTM D792 | g/cm$^3$ | 1.04 to 1.12 | 1.06 to 1.10 |
| melt flow rate (230° C., 3.8 kg) | ASTM D1238 | g/10 min | 0.5 to 15 | 2 to 5 |
| tensile stress at yield | ASTM D638 | Mpa | 30 to 55 | 36 to 48 |
| notched izod impact strength | ASTM D256 | J/m | 30 to 300 | 85 to 200 |

The ABS materials typically have a rubber content of between about 5 weight percent to about 30 weight percent, preferably between about 15 weight percent and about 25 weight percent, as shown in Example 4. When larger amounts of SAN are included in the mixture, however, the rubber content can be as low as about 5 weight percent. The properties of ABS product with different levels of SAN are illustrated in Examples 3 and 19. The glass transition temperature of the SAN component is between about 105° C. and about 110° C. and the glass transition temperature of the rubber is between about −90° C. and about −60° C. In addition, it has been found that the degradation temperature of the SAN component of the ABS is between about 390° C. and 406° C.

The melt flow rate of the ABS materials can be controlled and falls between those rates typical for the various grades of ABS virgin material, as seen in Examples 1, 3, 10 and 11. The unexpected uniformity of properties is shown in Example 20.

Because the waste plastic material from which the recycled ABS materials are prepared is typically derived from a range of plastic parts from a number of applications, a number of grades containing a wide variety of additives can be present, such as, antioxidants and UV stabilizers as described in Example 10. Further, Br and Sb containing compounds are typically present, small amounts of which can be detected using X-Ray fluorescence spectroscopy (XRF), as described in Example 18. Other more sensitive techniques can be used if only trace levels are present.

The ABS product can be compounded with impact modifiers and compatibilizers such as, high rubber ABS grades, copolymers of styrene and diene rubber, copolymers of styrene and maleic anhydride. The product can also be compounded with virgin or recycled polymers. These polymers can include ABS, as shown in Examples 8, 9 and 14; impact modified PS, as shown in Example 7; PC, as shown in Example 16; blends of PC and impact modified SAN, as shown in Example 17; copolymer blends of styrene acrylonitrile and acrylate polymers; polysulfone; copolymers of styrene and acrylonitrile; PVC; and other polymers. The range of added polymers can be from less than 1% to over 99% of the ABS product.

HIPS Materials

In another aspect, the invention provides recycled plastic materials that contain predominately recycled HIPS material. HIPS is one of the major products resulting from the recycling of white goods or other streams of durable goods. The HIPS materials obtained typically include about 30 to about 99.9 parts by weight of an impact modified styrene polymer. The HIPS materials also typically include 0 to about 60 parts by weight of general purpose polystyrene and about 0.1 to about 20 parts by weight of additives as described above. Additionally, the HIPS materials typically include 0 to about 50 parts by weight of at least one additional polymer. In particular implementations, the HIPS materials include from about 70 to 99 parts by weight of the impact modified styrene polymer, 0 to about 10 parts by weight of general purpose polystyrene, and about 1 to about 5 parts by weight of other additives. In particular implementations, the HIPS materials include from 0 to about 29 parts by weight of at least one additional polymer. The one additional polymer can be selected from the polymers including acrylonitrile butadiene styrene terpolymers, polystyrene, an impact modified polystyrene, or polyethylene.

In one embodiment, the HIPS recycled plastic material has about 60 to 98 parts by weight of HIPS, about 1 to about 10 parts by weight of one or more additives, about 0 to about 39 parts by weight of at least one additional polymer, and a rubber content of about 10% to 25% by weight. The glass transition temperature is between about 96° C. and about 100° C. and a PS degradation temperature between about 400° C. and about 415° C.

The HIPS materials exhibit a relatively uniform set of desirable properties. The following are the typical and preferred properties for the HIPS materials of the invention:

TABLE 3

| Property | Method | Units | Typical range | Preferred range |
| --- | --- | --- | --- | --- |
| density | ASTM D792 | g/cm$^3$ | 1.02 to 1.17 | 1.04 to 1.08 |
| melt flow rate (200° C., 5.0 kg) | ASTM D1238 | g/10 min | 0.5 to 15 | 2 to 8 |
| tensile stress at yield | ASTM D638 | MPa | 15 to 30 | 20 to 27 |
| notched izod impact strength | ASTM D256 | J/m | 30 to 150 | 60 to 120 |

The HIPS materials typically have a rubber content of between about 4 weight percent to about 20 weight percent, as shown in Example 22. In particular implementations, rubber is present in the range between about 8 weight percent and about 16 weight percent. The glass transition temperature of the polystyrene phase is between about 96° C. and about 100° C. and the glass transition temperature of the rubber is between about −90° C. and about −60° C. In addition, it has been found that the degradation temperature of the PS component of the HIPS product is between about 400° C. and 405° C. Methods for measuring rubber content, PS degradation temperature and glass transition temperature are described in Example 13.

As shown in Example 21, it is possible to obtain a recycled plastic material that has a melt flow rate that is intermediate between that used in extrusion grade HIPS and that used in injection grade HIPS. In particular, the melt flow rate would be about 2 to about 8 grams per 10 minutes. This is advantageous because the slightly lower melt flow rate relative to typical injection molding grades allows the plastic to be most effective as an interior plastic in co-injection molding applications. The slightly higher viscosity of the interior plastic relative to the exterior plastic should lead to a more uniform exterior layer. This means that the interior plastic can be used in a larger amount and in more complicated parts than would a material with a melt flow rate higher than that of the exterior plastic.

Because the waste plastic material is typically derived from a range of plastic parts from a number of applications, a number of grades containing a wide variety of additives can be present, such as, antioxidants and UV stabilizers. Further, Br and Sb containing compounds are typically present, small amounts of which can be detected using X-Ray fluorescence spectroscopy (XRF). Other more sensitive techniques can be used only trace levels are present.

The broad range of densities listed in the above table is due to the broad range of densities of component HIPS flakes. The density differences are primarily due to different pigment loadings, although small variations in rubber content and the amount of the additional polymer may also affect the density.

The HIPS materials can be compounded with virgin polymers including HEPS, general purpose PS, polyphenylene ether, modified polyphenylene ethers and any other virgin or non-virgin polymer with which HIPS is compatible. The HIPS materials can include from less than 1 percent of the compounded polymer to over 99 percent of the compounded polymer.

To increase the tensile strength of the HIPS materials, general purpose PS may be included in the mixture, as shown in Example 34. To control other properties of the HIPS materials, such as shrinkage, gloss and the heat deflection temperature, the amount of filled PP can be adjusted, as shown in Example 35. To control the melt flow rate and various mechanical properties, the HIPS materials can contain various quantities of modified PPO, as shown in Example 29. The properties of the HIPS materials are uniform, as shown in Example 36.

One of the unique characteristics of post-consumer recycled plastics is that the mixtures are typically derived from a range of plastic parts from a number of applications. Therefore, a number of grades containing a wide variety of additives may be present. A wide variety of antioxidants and UV stabilizers may be present in post-consumer plastics, as shown in Example 26.

PP Materials

In another aspect, the invention provides recycled plastic materials that contain predominately recycled PP material. PP is one of the major products resulting from the recycling of white goods or other streams of durable goods such as automotive shredder residue. The PP materials of the present invention typically include from about 60 to about 99 parts by weight of polypropylene. The PP materials also typically contain about 1 to about 40 parts by weight of additives, such as antioxidants, heat stabilizers, UV stabilizers, flame retardants, antistatics, blowing agents, impact modifiers, compatibilizers, fillers, fiber reinforcements, fluorescent whiteners, pigments, organic colorants, carbon black and lubricants, and 0 to about 24 parts by weight of at least one additional polymer. In particular implementations, the polypropylene is present in the range from about 88 to about 99 parts per weight, one or more additives are present in amounts ranging from about 1 to about 5 parts by weight, and one or more additional polymers are present in amounts ranging from 0 to about 7 parts per weight.

In one embodiment, the PP recycled plastic material has about 75 to 98 parts by weight of HIPS, about 1 to about 10 parts by weight of one or more additives, and about 1 to about 24 parts by weight of at least one additional polymer. The PP recycled plastic material has distinct melting points at about 125° C. and at about 164° C., crystallization temperatures at about 110° C. and at about 130° C. and a degradation temperature of about 430° C.

PP can be compounded with virgin polymers such as, PP, low density polyethylene, and other polymers. The PP materials have a relatively uniform set of desirable properties. The following are the typical and preferred properties for the PP materials:

TABLE 4

| Property | Method | Units | Typical range | Preferred range |
| --- | --- | --- | --- | --- |
| density | ASTM D792 | g/cm³ | 0.90 to 1.00 | 0.92 to 0.96 |
| melt flow rate (230° C., 2.16 kg) | ASTM D1238 | g/10 min | 5 to 50 | 15 to 40 |
| tensile stress at yield | ASTM D638 | MPa | 15 to 30 | 20 to 25 |
| notched izod impact strength | ASTM D256 | J/m | 30 to 300 | 50 to 150 |

The broad range of densities listed in the above table results from the broad range of densities of component PP flakes. The density differences are primarily due to different pigment and filler loadings, although small variations in copolymer content and the amounts of other plastics also affect the density. The PP materials are typically characterized by two melting points and two crystallization temperatures. These temperatures and their associated enthalpies of transition depend on the source of the polypropylene.

In one embodiment, the source of PP is white goods. The lower melting point is between about 120° C. and about 130° C. and has a melting enthalpy between about 0.5 J/g and about 2 J/g. The upper melting point is between about 162° C. and about 165° C. and has an enthalpy of between about 70 J/g and about 80 J/g. The ratio of the lower to upper melting enthalpies, which should be related to the ethylene content in the polymer, is less than about 0.02. The higher crystallization temperature is between about 124° C. and about 130° C. and has an enthalpy of between 76 J/g and about 85 J/g. The lower crystallization temperature is between about 105° C. and about 115° C. and has an enthalpy of between about 0.5 J/g and about 1.0 J/g. In addition, it has been found that the degradation temperature of the samples is between about 424° C. and about 432° C.

In another embodiment, the source of PP is automotive shredder residue. The lower melting point is between about 120° C. and about 130° C. and has a melting enthalpy between about 5 J/g and about 20 J/g. The upper melting point is between about 160° C. and about 166° C. and has an enthalpy of between about 35 J/g and about 80 J/g. The ratio of the lower to upper melting enthalpies, which should be related to the ethylene content in the polymer, is between about 0.1 and about 0.3. The higher crystallization temperature is between about 120° C. and about 130° C. and has an enthalpy of between 35 J/g and about 95 J/g. The lower crystallization temperature is between about 105° C. and about 120° C. and has an enthalpy less than about 10 J/g.

In yet another embodiment, the source is combined white goods and automotive shredder residue, where the lighter colored white goods PP are typically separated from the darker colored automotive PP. If color sorting is not included, the melting, crystallization and degradation temperatures and enthalpies generally lie somewhere between those of the two source materials. The consistency of other properties of the recycled plastic are shown in Example 42. Again, the consistency is due to the large degree of mixing of feed materials, the large scale of typical plastics recycling facilities and the method of manufacturing the PP materials.

Example 40 shows the variety of antioxidants and UV stabilizers that can be present in waste plastic materials and that ultimately are in the recycled plastic. Example 39 shows how impact modifiers can-be-used to -improve the toughness of the PP materials. Example 41 describes the compounding of a PP material with one type of reinforcing filler, fiber glass.

PC Materials

In another aspect, the invention provides recycled plastic materials that contain predominately recycled PC material. PC, PC/ABS and flame retarded grades of these materials are some of the major components of streams of durable goods.

The PC materials include about 5 to about 99 parts by weight of polycarbonate. The PC materials also typically include about 0 to about 94 parts by weight of ABS. Additionally, the PC materials typically include 0 to about 20 parts by weight of additives, such as, antioxidants, heat stabilizers, UV stabilizers, flame retardants, antistatics, blowing agents, impact modifiers, compatibilizers, fillers, fiber reinforcements, fluorescent whiteners, pigments, organic colorants, carbon black and lubricants. Stabilizers can include hindered phenols, phosphate stabilizers or epoxidized soybean oil. The PC product can also include 0 to about 30 parts by weight of at least one additional polymer. In particular embodiments, the PC materials include from about 20 to about 99 parts by weight of polycarbonate, from 0 to about 79 parts by weight of ABS, from 0 to about 10 parts by weight of additives, and from 0 to about 10 parts by weight of one or more additional polymers.

The PC materials can be compounded with additional impact modifiers and compatibilizers, such as PC and terpolymers of methyl methacrylate, butadiene and styrene (MBS). Further, the PC materials can be compounded with virgin polymers including ABS, PC, blends of PC and ABS, copolymer blends of styrene acrylonitrile and acrylate polymers, polysulfones, SAN and other polymers. Example 43 describes the use of impact modifiers and stabilizers to improve the toughness of recycled PC/ABS.

PC materials derived from mixtures of durable goods containing office automation equipment and consumer electronics will typically include flame retarded grades of ABS and HIPS as additional polymers because PC-containing plastics and flame retarded grades of ABS and HIPS are the predominant polymers used in manufacturing electronics equipment. Moreover, flame retarded grades of ABS and HIPS can be difficult to completely separate from PC-containing materials by ordinary density separation techniques.

PC materials derived from mixtures of durable goods containing automotive shredder residue will typically include nylons, PMMA and PBT as additional-polymers because PC-containing plastics and these plastics are some of the plastics used in automobiles. Moreover, these plastics can be difficult to completely separate from PC-containing materials by ordinary density separation techniques. Other polymers such as PP, filled PP, polystyrene, HIPS, ABS, SAN, polyphenylene ethers and others may be present in lesser amounts.

The invention will be further described in the following examples, which are illustrative only, and which are not intended to limit the scope of the invention described in the claims.

EXAMPLE 1

Properties of an ABS Product

A plastics-rich feed derived from refrigerators was first generated from a U.S. source. The refrigerator liners, plastic trays and other plastic parts were separated from the metal components and then shredded into small pieces. The small pieces or flakes were then subjected to a separation process. Following separation processes, a nearly 100% pure ABS product consisting of flakes from various grades of ABS was obtained.

The mixed ABS product was extruded, molded and tested. A light colored ABS product was formed from the mixed ABS product, which has properties between the extrusion and injection molding grades of virgin ABS shown in table 5.

TABLE 5

Properties of light colored ABS product from U.S. Refrigerators

| Material | Density $\rho$ (g/cm$^3$) | Flow rate MFR (g/10 min) | Tensile Stress at Yield (MPa) | Notched Izod Impact (J/m) |
|---|---|---|---|---|
| Mixed ABS | 1.070 | 2.3 | 42.8 | 168 |
| Bayer Lustran 521 (extrusion grade for refrigerators) | 1.1 | 1.7 | 42.8 | 85 |
| Bayer Lustran 1827 (injection grade for panels) | 1.05 | 3 | 42.8 | 294 |

EXAMPLE 2

FT-IR Spectroscopy, Dynamic Rheology and Atomic Force Microscopy of ABS

The stream of nearly pure mixed ABS from U.S. refrigerators described in Example 1 was separated into thin (<1.6 mm), mid (1.6-2.8 mm) and thick (>2.8 mm) fractions using-a slot thickness sorter. Mixed ABS and thin ABS were examined using Fourier Transform Infrared (FT-IR) spectroscopy and dynamic melt rheology. "Mixed ABS" was examined using atomic force microscopy.

To measure the FT-IR spectra of the samples, portions of injection molded specimens were pressed at 180° C. into thin films. Then small slices of the films were pressed individually in a diamond anvil optical cell to achieve comparable film thicknesses and FT-IR spectral absorbances less than 1.0 via transmission experiments. FIG. 1 shows the resulting FT-IR transmission spectrum for mixed ABS. The sample contains an acrylonitrile/butadiene/styrene polymer (ABS), a metal oxide (most likely titanium dioxide), carbon black (as evidenced by the sloping baseline), and a low level of ester-bearing material(s). A similar transmission spectrum is obtained for thin ABS.

FIG. 2 shows the absorbance spectra for mixed ABS and thin ABS. The thin ABS (Sample 2) has a slightly greater carbonyl absorption than the mixed ABS (Sample 1), suggesting that the thin material has a slightly higher level of material with carbonyl functional groups.

Samples for dynamic rheological experiments were prepared by molding sample pellets at 180° C. into 1.6 mm thick 25 mm diameter disks. Rheological properties were measured in a Rheometrics RDS II mechanical spectrometer using strain amplitudes ranging from 0.5% at high frequencies to 3% at low frequencies. FIG. 3 shows the elastic (G') and loss (G") shear moduli for mixed ABS and thin ABS at 200° C. The samples have very similar dynamic rheological properties over more than three decades of frequency.

Atomic force microscopy (AFM) was performed on microtomed sections of an injection molded mixed ABS specimen. AFM was performed in the tapping mode under normal and hard tapping conditions. FIG. 4 shows an AFM image of mixed ABS in the normal tapping mode. The dark spots in this image are dispersed rubber particles and some of the lighter spots are $TiO_2$ pigments. Image analysis suggests that the average size of these rubber domains is 0.40±0.15 mm and that the rubber content of the sample is about 18% by volume. Image analysis of the pigments suggests that the pigment exists as 0.5 to 2 mm agglomerates of 0.1 mm pigment particles and that the pigment content is 2-3% by volume.

EXAMPLE 3

Properties of ABS with and without SAN

One of the minor plastic components typically found in the ABS product is a thick, clear plastic found in injection molded refrigerator parts, SAN. The presence of SAN even at small amounts can significantly affect the melt flow rate of the ABS product. Table 6 gives the melt flow rates of ABS in three different density ranges both with and without the small amount of SAN that typically end up with the ABS product. Since SAN is thick, these samples are all from the thick (>2.8 mm) fraction of the ABS product. The low density range is from 1.070 to 1.074 g/cm$^3$, the "medium density" range is from 1.074 to 1.091 g/cm$^3$, and the "high density" range is from 1.091 to 1.116 g/cm$^3$.

TABLE 6

Melt flow rates of thick ABS

| sample | MFR (g/10 min) with SAN | MFR (g/10 min) w/o SAN |
| --- | --- | --- |
| Low density ABS | 3.5 | 2.7 |
| Medium density ABS | 2.7 | 2.4 |
| High density ABS | 2.8 | 2.0 |
| SAN alone | 6.1 | na |

EXAMPLE 4

Analysis of ABS Component Pieces from Refrigerators

About twenty samples were obtained from end-of-life U.S. refrigerators. The parts included door liners, butter doors and crispers. The samples obtained were from refrigerators dating from the 1970's through 2000. The density of the parts ranged from 1.06 g/cm$^3$ to 1.097 g/cm$^3$, and the thickness ranged from 0.8 mm to about 2.0 mm.

Rheological and mechanical tests were performed on a subset of the samples. The melt flow rate ranged from about 0.8 grams per 10 minutes to about 2.7 grams per 10 minutes, the tensile at yield ranged from 41.0 MPa to about 49.3 MPa, and the notched Izod ranged from 130 J/m to about 220 J/m, with one sample having a notched Izod of 360 J/m. Since the number of samples tested was not representative of the total variety of ABS from refrigerators, actual ranges may be even larger.

Thermogravimetric analysis (TGA) was performed using the dynamic high resolution feature of a TA Instruments TGA Q500. The resolution was set to 4.00 C and the sensitivity was set to 1.00. The heating rate was 50° C. per minute when the weight was not changing significantly. The samples were under a nitrogen purge until 500° C., at which time the samples were purged with dry air to complete the oxidation. The degradation temperatures reported below are the maxima of the derivative weight loss (DTGA) curves. FIG. 5 shows the TGA curves for the mixed, thin, mid and thick fractions of ABS from a group of the U.S. refrigerator samples. These fractions degrade at similar temperatures, above about 390°. This degradation is attributed to the SAN portion of the ABS. Above 400° C., a broad degradation-attributed to rubber is observed. FIG. 6 shows a plot of the TGA and DTGA curves for the mixed ABS sample (combination of the thick, mid and thin samples). The compositions were determined by defining step changes relative to the derivative peaks.

As shown in table 7, the percent rubber varied from about 16 weight percent to about 20 weight percent, the titanium dioxide content varied from about 5 weight percent to about 5.8 weight percent, and the SAN degradation temperatures were all at 400° C. or above. Analysis of the sample parts obtained from end-of-life refrigerators showed similar results, with the percent rubber varying from 16 to 24 weight percent, the titanium dioxide level varying from 2 weight percent to 6.8 weight percent and the SAN degradation temperature varying from 390° C. to 406° C.

TABLE 7

Compositions and SAN degradation temperatures

| Sample | Weight % rubber | Weight % $TiO_2$ | SAN Degradation (° C.) |
| --- | --- | --- | --- |
| ABS mixed | 17 | 5.0 | 402 |
| ABS thin | 16 | 5.8 | 401 |
| ABS mid | 20 | 5.1 | 401 |
| ABS thick | 19 | 5.0 | 400 |

Differential scanning calorimetry (DSC) was performed using a TA Instruments DSC Q1000. The program used a heat-cool-heat cycle with 10° C./minute heating and cooling rates between 50° C. and 150° C. Thermograms from the second heating cycle are used to determine the glass transition temperatures reported below. DSC thermograms of the various samples showed glass transition temperatures ranging from around 105° C. to over 111° C., with one sample having a glass transition temperature of 101.8° C. For the thin, thick, mid and mixed ABS samples, the glass transition temperatures varied from 106.4° C. to 108.5° C.

EXAMPLE 5

DMA to Determine the Rubber Glass Transition Temperature in ABS

Dynamic mechanical analysis was performed on ABS products derived from Japanese white goods (JWG) and from U.S. office automation equipment (U.S. OA). FIG. 7 shows the flexural loss modulus (E") and tan δ (E'/E") curves (E" is the elastic or storage modulus) for the two materials as a function of temperature. The samples were tested at a frequency of 1 Hz and a temperature ramp of 5° C. per minute.

ASTM defines the glass transition temperature as temperature at which the maximum of E" occurs. The glass transition temperature for the ABS from JWG is −74.4° C. and the glass transition temperature for the ABS from U.S. OA is −79.2° C. As seen in FIG. 7, the transition for the rubber in the ABS product from JWG is over a broader temperature range than that for the rubber in ABS product from U.S. OA. This is as expected, since the JWG feed stream contains a broader assortment of parts, and therefore a broader assortment of ABS grades. ABS product from U.S. OA also contains a relaxation at about 20° C. that is not present in the JWG ABS product.

EXAMPLE 6

Use of Impact Modifiers to Improve the Properties of ABS from JWG

A light colored ABS product recovered from JWG had relatively low impact strength for ABS. This can be the case if the purity is not high enough or if the ABS grades are not very tough. Two different levels of a high rubber ABS impact modifier (Blendex 338) were added to the product to create grades with higher impact strength and lower tensile strength. Table 8 shows the mechanical properties of these materials.

TABLE 8

Mechanical properties of ABS product from JWG with a high rubber ABS impact modifier

| Product | NI (J/m) | TSY (MPa) |
|---|---|---|
| Light ABS | 96 | 38.6 |
| light ABS + 5% Blendex 338 | 145 | 35.0 |
| light ABS + 10% Blendex 338 | 188 | 34.4 |

EXAMPLE 7

ABS Product from Consumer Electronics and Office Automation Equipment

Pure ABS was obtained from TV remote controls and pure HIPS was obtained from computer keyboards ground into flakes. Samples of ABS and HIPS in various proportions were blended by lab extrusion and made into specimens by injection molding. The compositions and properties are shown in Table 9.

TABLE 9

Properties of ABS/HIPS Blends

| Sample composition | NI (J/m) | TSY (MPa) |
|---|---|---|
| pure ABS | 182 | 41.4 |
| 99.5% ABS/0.5% HIPS | 188 | 41.1 |
| 98% ABS/2% HIPS | 193 | 40.7 |
| 96% ABS/4% HIPS | 198 | 40.2 |
| 94% ABS/6% HIPS | 209 | 39.5 |
| 90% ABS/10% HIPS | 188 | 38.3 |

For these particular grades of ABS and HIPS, the impact strength of ABS increases when the amount of HIPS is between about 0% and about 8%. The tensile strength decreases with higher levels of HIPS.

Further analysis of the component materials shows that the ABS has a $T_g$ of 103.6° C. and about 25% rubber. The HIPS has a $T_g$ of 97.7° C. and about 15% rubber. This suggests that the impact strength may not be explained purely by an increase in rubber content.

EXAMPLE 8

Environmental Stress Crack Resistance of ABS Product

The environmental stress crack resistance (ESCR) of materials can be an important property requirement for the application in which the material is used. For examples, plastics used in refrigerators preferably have a good ESCR to both food oils and blowing agents used to create foam insulation. Similarly, plastics used in automotive applications (VA) preferably have good ESCR to petroleum-based oils and greases.

The ESCR properties of four grades of ABS were investigated. One grade was derived from vacuum cleaners (VC). Another grade was derived from office automation equipment (OA). A third grade was derived from JWG. The fourth grade was virgin ABS typically used in VA. Each of the individual grades and 50/50 mixtures of all six pairs of these grades were exposed to olive oil while being subjected to a 2% flexural strain. The approximate times for cracks to appear and the times to complete failure are given in Table 8. If cracks did not appear after 72 hours, the tensile strength of the sample was measured and compared with the tensile strength prior to exposure to the olive oil. All the tensile specimens exposed to olive oil that did not exhibit cracks after 72 hrs fractured in a brittle manner in the tensile test. An audible cracking sound occurred just prior to the samples breaking. As seen in Table 10 and FIG. 8, samples containing ABS from JWG retained a greater percentage of initial tensile strength at yield (TSY) than the other samples. Thus, incorporation of ABS from this source into other grades of ABS from other sources can improve the ESCR.

TABLE 10

ESCR of ABS grade mixtures exposed to olive oil

| Sample | Time for cracks to appear (hrs) | Time for complete failure (hrs) | Initial TSY (MPa) | TSY after 72 hrs (MPa) |
|---|---|---|---|---|
| VC | 4-18 | 49 | 36.6 | 0 |
| OA | no cracks | no failure | 39.3 | 33.3 |
| JW | no cracks | no failure | 40.9 | 39.1 |
| VA | no cracks | no failure | 33.5 | 31.1 |
| VC + OA | 4-18 | 4-18 | 37.8 | 0 |
| VC + JW | no cracks | no failure | 38.2 | 36.3 |
| VC + VA | 30 ± 20 | 47 ± 3 | 33.0 | 0 |
| OA + JW | no cracks | no failure | 39.3 | 36.3 |
| OA + VA | no cracks | no failure | 35.1 | 31.1 |
| JW + VA | no cracks | no failure | 34.7 | 34.1 |

Each of the individual grades and 50/50 mixtures of all six pairs of these grades were also exposed to 76 weight lubricating oil at the same 2% flexural strain for 72 hours. Cracks did not appear in any of the specimens.

Tensile tests were performed on all of the samples exposed to lubricating oil. Unlike the samples exposed to olive oil, these specimens failed after yielding. Table 8 shows the tensile strengths before and after exposure to lubricating oil, along with observations about the specimens during tensile testing. All of the specimens retained at least 97% of their original tensile strength at yield. Table 11 shows results which suggest that VA has the best ESCR, JWG has the second best ESCR, and VC and OA have the worst ESCR to lubricating oil. Addition of ESCR grades to non-ESCR grades of ABS can result in ABS products with improved environmental stress crack resistance compared with the non-ESCR grade.

TABLE 11

ESCR of ABS grade mixtures exposed to 76 weight lubricating oil

| Sample | Initial TSY (MPa) | TSY after 72 hrs (MPa) | Observation during tensile tests |
|---|---|---|---|
| VC | 36.6 | 35.9 | Breaks right after yield. Break is quiet and also incomplete. |
| OA | 39.3 | 39.1 | Breaks right after yield. |
| JW | 40.9 | 39.6 | Banding and cracking after yield and before failure. |
| VA | 33.5 | 33.5 | High elongation before failure. Almost as good as before exposure. |
| VC + OA | 37.8 | 37.0 | Breaks right after yield. |
| VC + JW | 38.2 | 37.5 | Banding and cracking after yield and before failure. |
| VC + VA | 33.0 | 33.3 | No banding or cracks form prior to failure. |
| OA + JW | 39.3 | 39.9 | Banding and cracking after yield and before failure. |
| OA + VA | 35.1 | 34.0 | Banding and cracking after yield and before failure. |
| JW + VA | 34.7 | 34.5 | Banding and cracking after yield and before failure. |

EXAMPLE 9

Improved Impact Strength of ABS Blends

The notched izod impact strength of some of the samples described in Example 8 were tested and the notched izod impact strength improved for the 50:50 blends. Table 12 shows the notched izod impact strength (ASTM D256) for the components and for the blends. The change in impact strength relative to the lower impact component is also shown. In all cases, improvement in the impact strength occurred.

TABLE 12

Notched izod impact strength of ABS grades and 50:50 blends

| Sample | NI (J/m) | ΔNI (J/m) |
|---|---|---|
| VC | 251 | |
| OA | 213 | |
| JW | 102 | |
| VA | 210 | |
| VC + OA | 224 | +11 |
| VC + JW | 161 | +59 |
| VC + VA | 276 | +66 |
| OA + JW | 130 | +28 |
| OA + VA | 229 | +19 |
| JW + VA | 189 | +87 |

EXAMPLE 10

Additives in ABS

Additives were extracted from a sample of ABS product derived from JWG by dissolving the plastic in tetrahydrofuran and then precipitating the polymer with methanol. The extracted solution was analyzed using high performance liquid chromatography (HPLC). Additives were detected by UV absorption at 254.4, 275.4 and 325.4 nm. FIG. 9 shows the HPLC chromatogram (absorbance at 275.4 nm) of the solution of extracted additives. The peak at 4.181 minutes was determined to be either the antioxidant butylated hydroxytoluene (BHT) or a metal deactivator from Ciba known by the tradename Irganox MD 1024. The other peaks were not identified, but likely correspond to other trace additives from the ABS sample.

EXAMPLE 11

Controlling the Melt Flow Rate of ABS

Two high purity ABS products were recovered from a stream of mixed JWG using a plastic separation process. Extrusion grades of ABS are concentrated in a fraction containing thinner flakes (L ABS) and injection molding grades of ABS are concentrated in a fraction containing thicker flakes (H ABS). The melt flow rates of the two products are shown in Table 13. The MFR was measured according to the ISO 1133 condition for ABS.

TABLE 13

Properties of gray ABS products from JWG

| sample | MFR (g/10 min) @ 220/10.0 |
|---|---|
| L ABS | 7.5 |
| H ABS | 16.4 |

FIG. 10 shows the MFR as a function of composition for various compounds of the L and H ABS products. The ABS product can be recombined to formulate a desired MFR for the product as long as it lies between 7.5 and 16.4.

EXAMPLE 12

Impact Modification of ABS from OA

An ABS-rich plastic mixture was recovered from a mixture of shredded waste OA. The composition of the ABS-rich mixture was within the preferred composition range. The mixture was compounded along with 0.1% of a primary antioxidant (Irganox 1076). A triblock copolymer of styrene and butadiene manufactured by Dexco known as Vector 8508 contains 29% styrene and 71% butadiene. Vector 8508 was added at 9.1% by weight to improve the impact of the ABS-rich plastic mixture. The impact modified ABS was also compounded with 0.1% Irganox 1076. Both unmodified and modified ABS products were injection molded and the notched izod impact strength was tested according to ASTM D256. The notched izod impact strength increased from 186 J/m for the unmodified ABS to 366 J/m for the ABS modified with 9.1% Vector 8508.

EXAMPLE 13

Impact Modification of Flame Retarded ABS from OA

An ABS-rich plastic mixture was recovered from a mixture of shredded waste OA. The mixture contained mostly flame retarded ABS and the composition was within the preferred composition range. The mixture was pelletized without additional additives. A high rubber ABS manufactured by GE known as Blendex 338 was added at 5% by weight to improve the impact of the ABS-rich plastic mixture. The impact modified ABS was compounded into pellets. Both unmodified and modified flame retarded ABS products were injection molded and the notched izod impact strength was tested according to ASTM D256. The notched izod impact strength increased from 90 J/m for the unmodified ABS to 160 J/m for the impact modified flame retarded ABS.

EXAMPLE 14

Blending Recycled ABS from Consumer Electronics with Virgin ABS

Gray colored ABS product from TV remote controls was compounded with natural Magnum 545 ABS manufactured by Dow Chemical. Table 14 lists the compositions and notched izod impact strengths (ASTM D256) of the various compounds. The data demonstrates that mixtures of different virgin and recycled ABS grades may in some cases have improved properties relative to the pure component plastics. The addition of recycled ABS in fact improves the toughness of virgin ABS in this case.

TABLE 14

Gray ABS from TV remote controls compounded with Magnum 545

| Sample | % Magnum 545 | % Gray ABS | NI (J/m) |
| --- | --- | --- | --- |
| M100 | 100 | 0 | 276 |
| M90F10 | 90 | 10 | 292 |
| M80F20 | 80 | 20 | 287 |
| F100 | 0 | 100 | 181 |

EXAMPLE 15

Creation of Black Colored ABS from OA

Light gray colored ABS was derived from a mixed stream of post-consumer OA. AB925 is a black color concentrate manufactured by Modem Dispersions. AB925 contains 25% C black (19 nm particle size) in an ABS/SAN carrier resin with a MFR=8 g/10 min. Blendex 338 from GE is a high rubber ABS powder that may be added to ABS to improve the toughness. In order to make a desired black product, a relatively large amount (8%) of AB925 was added to the light gray ABS. This compound was charcoal in color, but had lower impact strength than the original sample. Blendex 338 was added as an impact modifier to improve the impact strength. Table 15 shows the notched izod impact strength (ASTM D256) of various ABS products created from these three materials.

TABLE 15

Properties of ABS compounded from light gray ABS

| sample | % gray ABS | % AB925 | % Blendex 338 | NI (J/m) | color |
| --- | --- | --- | --- | --- | --- |
| A | 100 | 0 | 0 | 223 | light gray |
| B | 92 | 8 | 0 | 101 | charcoal |
| C | 87 | 8 | 5 | 143 | charcoal |

EXAMPLE 16

Blends of ABS Derived from OA with PC

Gray ABS derived from a stream of mixed OA was compounded with virgin and regrind PC. The virgin PC was blue Merlon M 40H-R. The regrind PC was a gray flame retardant grade produced by Dow Chemical known as Calibre 801-10. A PC/ABS product from mixing 50% ABS with 50% virgin PC had a notched izod impact strength (ASTM D256) of 579 J/m and a tensile strength at yield (ASTM D638) of 51.8 MPa (measured at 5.08 mm/min). These values are significantly higher than those for the ABS alone (212 J/m and 39.3 MPa). A PC/ABS product from mixing 75% ABS with 25% flame retardant PC regrind had a tensile strength at yield (ASTM D638) of 46.4 MPa (measured at 5.08 mm/min) compared with 39.3 MPa for the ABS alone.

EXAMPLE 17

Blends of ABS Derived from OA with PC/ABS

Gray ABS derived from a stream of mixed OA was compounded with a virgin blend of polycarbonate and ABS (PC/ABS). The virgin PC/ABS was white pigmented Pulse 830 produced by Dow Chemical. A PC/ABS product from mixing 50% ABS with 50% virgin PC/ABS had a notched izod impact strength (ASTM D256) of 476 J/m and a tensile strength at yield (ASTM D638) of 46.8 MPa (measured at 5.08 mm/min). These values are significantly higher than those for the ABS alone (212 J/m and 39.3 MPa).

EXAMPLE 18

Br and Sb in Non-flame Retarded Grades of ABS

X-Ray fluorescence analysis was performed on a sample of ABS derived from OA(OA) as well as virgin ABS (Dow Magnum 545). The voltage was set to 40 kV and the current to 25 µA. No filter was used. FIG. 11 shows the spectra of the two samples. As shown, the ABS from OA (black lines) contains both Br and Sb, whereas the virgin ABS (black background) contains neither at levels detectable using these experimental conditions. The amount of Br in the ABS from OA is approximately 0.3% and the amount of Sb is approximately 0.1%.

EXAMPLE 19

ABS Products with Controlled Amounts of SAN

ABS products with distinct compositions were derived from JWG and OA using a separation processes. One of the products was enriched in SAN (high SAN) and the other depleted in SAN (low SAN). The low SAN product also contained 6% HIPS as an additional polymer. Table 16 gives the % SAN and properties of the two product streams as well as of a 50:50 mixture of the two products. The high SAN product has low impact strength, high tensile strength and a high melt flow rate. The low SAN product has higher impact strength, lower tensile strength and a lower melt flow rate. A 50:50 mixture has intermediate mechanical properties.

TABLE 16

Properties of ABS/SAN TES products

| sample | % SAN | MFR (g/10 min) | NI (J/m) | TS @ Y (MPa) |
| --- | --- | --- | --- | --- |
| high SAN | 52 | 9.8 | 46 | 51.9 |
| low SAN | 3 | 8.3 | 102 | 42.7 |
| 50:50 mixture | 27 | N/A | 75 | 46.5 |

EXAMPLE 20

Consistency of ABS Products

ABS products derived from durable goods typically have very consistent properties due to the large degree of mixing of feed materials, the large scale of typical plastics recycling facilities and the method of manufacturing the ABS product. The properties of virgin ABS polymers are significantly determined by the reaction conditions (temperature, reaction time, reactant concentrations), since these conditions determine the molecular weight and composition of the polymer. For recycled ABS products, on the other hand, the properties are determined by factors such as the mix of feed materials and the separation process. Because the process is performed on a large scale, the mix of plastic flakes in the product is typically very consistent.

The consistency of recycled ABS products is shown schematically by FIG. 12. In FIG. 12, a mixture of flakes with various melt flow rates (determined by the molecular weight of the polymer in the flake) are compounded to create pellets with a very consistent melt flow rate. Even if the flakes are the same grade of plastic where the melt flow rate was only controlled between 5 and 7 g/10 min, the melt flow rate of the product pellets will have a tighter range of melt flow rates. Other properties of recycled ABS are also controlled tightly by this large scale mixing. Table 17 shows the melt flow rate and tensile strength at yield of various lots (greater than 2,000 lbs each) of recycled ABS from office automation equipment. The rheological and mechanical properties are very consistent for these ABS lots recovered from highly mixed feeds.

TABLE 2.17

Properties of ABS lots derived from Office Automation Equipment

| lot | MFR (g/10 min) | TS @ Y (MPa) |
|---|---|---|
| A | 8.5 | 41.4 |
| B | 8.1 | 40.9 |
| C | 8.0 | 40.9 |
| D | 8.0 | 40.9 |
| E | 8.5 | 40.9 |

EXAMPLE 21

Properties of a HIPS Product

A plastics-rich feed derived from white goods and other appliances was generated from a Japanese source. The small pieces or flakes were then subjected to a separation process as previously described. Following these separation process, a relatively pure HIPS product consisting of flakes from various grades of HIPS was obtained. The light HIPS product was extruded, molded and tested. The resulting gray colored HIPS product has a melt flow rate between those of the extrusion and injection molding grades of virgin HIPS shown in the table. The tensile strength is somewhat higher and the impact strength somewhat lower than the extrusion and injection molding grades. This is likely due to the presence of a small amount of ABS in the product. Table 16 shows the properties of the light HIPS product.

TABLE 16

Properties of light colored HIPS product from JWG

| Material | ρ (g/cm3) | MFR (g/10 min) | NI (J/m) | TSY (MPa) |
|---|---|---|---|---|
| light HIPS | 1.05 | 5.0 | 74 | 26.7 |
| Dow Styron A-Tech 1170 (extrusion grade for refrigerators) | 1.04 | 2.1 | 92 | 17 |
| Dow Styron 478 (injection grade for refrigerators) | 1.04 | 6 | 124 | 23 |

EXAMPLE 22

Analysis of HIPS Component Pieces from Refrigerators

About thirty samples were obtained from end-of-life U.S. refrigerators. The parts included door liners, butter doors and crispers. The samples obtained were from refrigerators from the 1970's all the way up to 2000. The density of the parts ranged from 1.03 g/cm$^3$ to 1.08 g/cm$^3$, and the thickness ranged from 0.9 mm to about 3.8 mm. TGA was performed using the dynamic high resolution feature of a TA Instruments TGA Q500. The resolution was set to 4.00 C and the sensitivity was set to 1.00. The heating rate was 50° C. per minute when the weight was not changing significantly. The samples were under a nitrogen purge until 500° C., at which time the samples were purged with dry air to complete the oxidation. The degradation temperatures reported are the maxima of the derivative weight loss (with respect to temperature) curves. The low, high and average values for the rubber content, pigment loading and PS degradation temperature for the samples of HIPS from U.S. refrigerators are shown in Table 17.

TABLE 17

Compositions and PS degradation temperature ranges and averages for HIPS from U.S. refrigerators

| Sample | Weight % rubber | Weight % TiO2 | PS Degradation (° C.) |
|---|---|---|---|
| low | 8.6 | 0.9 | 401 |
| high | 15.9 | 4.6 | 414 |
| average | 13.5 | 1.8 | 408.5 |

As shown in Table 17, the percent rubber varied from about 9 weight percent to about 16 weight percent, the titanium dioxide content varied from about 0.9 weight percent to about 4.6 weight percent, and the PS degradation temperatures varied from about 401° C. to about 414° C.

DSC was performed using a TA Instruments DSC Q1000. The program used a heat-cool-heat cycle with 10° C./minute heating and cooling rates between 50° C. and 150° C. Thermograms from the second heating cycle are used to determine the glass transition temperatures reported below. DSC thermograms of the various samples showed glass transition temperatures ranging from around 97° C. to around 100° C., with one sample having a glass transition temperature of 101.9° C. and one sample having a glass transition temperature of 89.5° C. The average glass transition temperature was 98.1° C. One of the samples from a refrigerator main liner showed a melting endotherm at 129° C., which suggests the presence of a PE surface layer.

EXAMPLE 23

DMA to Determine the Rubber Glass Transition Temperature in HIPS

DMA was performed on HIPS products derived from JWG and from U.S. OA. FIG. 13 shows the flexural loss modulus (E") and tand (E'/E") curves for the two materials as a function of temperature. The samples were tested at a frequency of 1 Hz and a temperature ramp of 5° C. per minute. ASTM defines the glass transition temperature as the maximum of E". The glass transition temperature for the ABS from JWG is −75.6° C. and the glass transition temperature for the ABS from U.S. OA is −86.0° C. According to FIG. 12, there may also be a significant transition for the rubber in the HIPS from JWG at around −20° C. There is perhaps a smaller transition from HIPS from U.S. OA in the same range. This is as expected, since the JWG feed stream contains a broader assortment of parts, and therefore a broader assortment of HIPS grades. The HIPS from U.S. OA also contains a relaxation at about 10° C. that is not present in the JWG HIPS product.

EXAMPLE 24

Use of Impact Modifiers to Improve the Properties of HIPS from JWC

A light HIPS product recovered from JWG had a relatively low impact strength for HIPS. This can be the case if the purity is not high enough, if the material degraded in-use or in reprocessing, or if the HIPS grades are not very tough. Two different levels of a high rubber SBS block copolymer impact modifier (Vector 8508) were added to the product to create grades with higher impact strength and lower tensile strength. Table 18 gives the mechanical properties of these materials.

TABLE 18

Mechanical properties of HIPS from JWG with an SBS HIPS impact modifier

| Product | NI (J/m) | TSY (MPa) |
|---|---|---|
| light HIPS | 59 | 25.8 |
| light HIPS + 5% Vector 8508 | 96 | 24.4 |
| light HIPS + 10% Vector 8508 | 123 | 21.5 |

EXAMPLE 25

Use of Impact Modifiers to Improve the Properties of HIPS from U.S. Refrigerators The starting material for these tests was a stream of HIPS-rich plastic flakes derived from U.S. refrigerators. Analysis of the product shows that it contains 60% HIPS, 20% ABS and 20% PP (mostly filled). This light HIPS product has poor mechanical properties, as shown in Table 19. In order to improve the toughness of the material, ten weight percent of a styrene butadiene block copolymer from Firestone called Stereon 841A is added to the light HIPS. The properties of this drastically toughened material are shown in Table 19. These results indicate that it is possible to create products with reasonable properties even when the product purity is not good.

TABLE 19

Mechanical properties of HIPS from U.S. refrigerators with an SBS block copolymer impact modifier

| product | NI (J/m) | TSY (MPa) |
|---|---|---|
| light HIPS | 18 | 23.8 |
| light HIPS + 10% Stereon 841A | 87 | 17.6 |

EXAMPLE 26

Additives in HIPS

Additives were extracted from a sample of HIPS derived from JWG by dissolving the plastic in hot xylene and then precipitating the polymer with methanol. The extracted solution was analyzed using HPLC. Additives were detected by UV absorption at 254.4, 275.4 and 325.4 nm. FIG. 14 shows the HPLC chromatogram (absorbance at 275.4 nm) of the solution of extracted additives. One of the peaks was determined to be the light absorber 2-(2'-hydroxy-5'-octylphenyl)-benzotriazole (sold as Tinuvin 329 by Ciba or Cyasorb UV-5411 by Cytec Industries). The other peaks were not identified, but likely correspond to other trace additives from the HIPS sample.

EXAMPLE 27

Impact Modification of HIPS from JWG

A HIPS product derived from JWG contained HIPS and other components in the preferred range. Stereon 841A from Firestone is a multiblock copolymer of styrene and butadiene that can be added to HIPS to improve the toughness. The HIPS was extruded and pelletized. The HIPS pellets were injection molded both with and without Stereon 841A. Table 20 shows the mechanical properties (ASTM D256 and ASTM D638) of the HIPS products.

TABLE 20

Mechanical Properties of HIPS derived from JWG

| Sample | NI (J/m) | TS @ Y (MPa) |
|---|---|---|
| HIPS | 65 | 26.7 |
| HIPS + 2% Stereon 841A | 104 | 26.2 |

Slight delamination was observed when base resin specimens were broken, but none was observed for the sample with 2% Stereon 841A.

EXAMPLE 28

Flame Retarded HIPS Derived from Television-rich Streams

Flame retarded HIPS recovered from a stream of mostly postconsumer televisions had a notched izod impact strength of 90 J/m (ASTM D256) and a tensile strength of 26.0 MPa (ASTM D638). This HIPS product also had a density of 1.15 g/cm³ due to the presence of high levels of Br and Sb. This product achieves a V-2 rating (drips ignited cotton) in the UL 94V test.

EXAMPLE 29

Properties of HIPS Compounded with Modified PPO

Certain feed streams from office automation contain large amounts of both HIPS and modified PPO. As an example of a product made from such a stream, consider a mixture of gray HIPS from keyboards compounded with modified PPO from toner cartridges. Table 21 shows the melt flow rate (ASTM D1238 at 200/5.0) mechanical properties (ASTM D256 and ASTM D638) for various blends of HIPS with modified PPO.

TABLE 21

Properties of blends of HIPS with modified PPO
HIPS/PPO Blends (10/16/00)

| Sample | % HIPS | % PPO | MFR (g/10 min) | NI (J/m) | TS @ Y(MPa) |
|---|---|---|---|---|---|
| HIPS | 100 | 0 | 4.6 | 149 | 23.5 |
| HIPS76/PPO24 | 76 | 24 | 2.9 | 170 | 26.2 |

Table 19 shows that larger amounts of modified PPO in the HIPS product reduce the melt flow rate while increasing the impact strength and tensile strength at yield. Careful control of the composition may therefore lead to controlled and advantageous mechanical properties.

EXAMPLE 30

Creation of Black HIPS from OA

HIPS derived from OA was compounded with a black color concentrate and with an impact modifier. PS908 is a color concentrate produced by Modern Dispersion. Vector 8508 is a triblock copolymer of styrene and butadiene that may be used as an impact modifier. The unmodified HIPS had a notched izod impact strength of 90 J/m (ASTM D256). After adding 10% PS908 and 10% Vector 8508, the charcoal colored HIPS product had a notched izod impact strength of 196 J/m.

EXAMPLE 31

Impact Modification of HIPS from OA

A HIPS product was recovered from a stream of mixed OA. The composition of the mixed flakes was within the preferred range. In order to improve the toughness, 10% of Vector 6241 (a triblock copolymer manufactured by Dexco) was added. The notched izod impact strength (ASTM D256) increased from 112 J/m for the unmodified HIPS to 170 J/m for the HIPS with 10% Vector 6241 added.

EXAMPLE 32

HIPS from JWG Compounded with Flame Retarded HIPS

A HIPS-rich flake mixture recovered from JWG had poor mechanical properties due to the presence of ABS and filled PP outside of the preferred composition range. Rather than further purification or addition of impact modifiers, the mixture was added in small amounts to flame retarded HIPS derived from OA. Table 22 shows the notched izod impact strength (ASTM D256) of the flame retarded HIPS with various amounts of HIPS from JWG added. This example shows that small amounts of a HIPS-rich mixture from JWG can be added to flame retarded HIPS from OA in order to create a product with good mechanical properties.

TABLE 22

HIPS from JWG added to flame retarded HIPS

| Sample | % HIPS from JWG | NI (J/m) |
|---|---|---|
| A | 0 | 104 |
| B | 10 | 100 |
| C | 25 | 91 |

EXAMPLE 33

HIPS from JWG Compounded with HIPS from OA

The same HIPS mixture from JWG described in Example 30 was added in small amounts to HIPS from OA. Table 23 shows the notched izod impact strength (ASTM D256) of the HIPS from OA with various amounts of HIPS from JWG added.

TABLE 23

HIPS from JWG added to HIPS from OA

| Sample | % HIPS from JWG | NI (J/m) |
|---|---|---|
| A | 0 | 117 |
| B | 10 | 110 |
| C | 25 | 100 |

EXAMPLE 34

General Purpose PS in HIPS to Improve the Tensile Strength

General purpose PS typically has a greater tensile strength than impact modified HIPS. PS and HIPS are compatible, so combining them should result in a HIPS product with a greater tensile strength. We have found that a HIPS product containing about 25 percent PS has a tensile strength at yield of about 31 MPa, whereas HIPS products without PS may have a tensile strength at yield of about 23 MPa (see Table 21).

EXAMPLE 35

Filled PP in HIPS to Adjust Various Physical Properties

Filled PP may be included in HIPS compositions to increase the shrinkage, to reduce gloss and to alter the mechanical properties. Since PP is a crystalline polymer, its crystallization will lead to increased mold shrinkage of the HIPS product as well as surface roughness that will reduce the gloss. In addition, mechanical properties such as the heat deflection temperature should increase when filled PP is included in the HIPS.

EXAMPLE 36

Consistency of HIPS Products

The properties of virgin HIPS polymers are significantly determined by the reaction conditions (temperature, reaction time, reactant concentrations), since these conditions determine the molecular weight and composition of the polymer. For recycled HIPS products, on the other hand, the properties are determined by factors such as the mix of feed materials and the separation process. Because the process is performed on a large scale, the mix of plastic flakes in the product is typically very consistent. The consistency of recycled HIPS products is shown schematically by FIG. 12. In FIG. 12, a mixture of flakes with various melt flow rates (determined by the molecular weight of the polymer in the flake) are compounded to create pellets with a very consistent melt flow rate. Even if the flakes are the same grade of plastic where the melt flow rate was only controlled between 5 and 7 g/10 min, the melt flow rate of the product pellets will have a tighter range of melt flow rates.

FIG. 15 shows the melt flow rate various lots (approximately 40,000 lbs each) of recycled HIPS from office automation equipment. The Theological properties are very consistent (MR between 5.8 and 6.6 g/10 min) for these HIPS lots recovered from highly mixed feeds, even though individual flakes can have melt flow rates below 5 or above 7 g/10 min. Similar consistency is also observed for the notched izod impact strength and tensile strength for these products. The notched izod impact strength varies from 93 to 109 J/m and the tensile strength varies from 22.3 to 24.5 MPa for this HIPS product.

EXAMPLE 37

Properties of a PP Product from JWG

A light colored PP product was derived from Japanese goods using recycling processes described in the previous sections. The PP flake is pelletized, injection molded and tested according-to standard procedures. The properties are shown in Table 24.

TABLE 24

Properties of light colored PP product from JWG

| Material | r (g/cm3) | MFR(g/10 min) | TSY (MPa) | NI (J/m) |
|---|---|---|---|---|
| light PP | 0.92 | 24 | 24.8 | 62 |

EXAMPLE 38

Thermal Analysis of PP Samples from JWG

Figure 17:
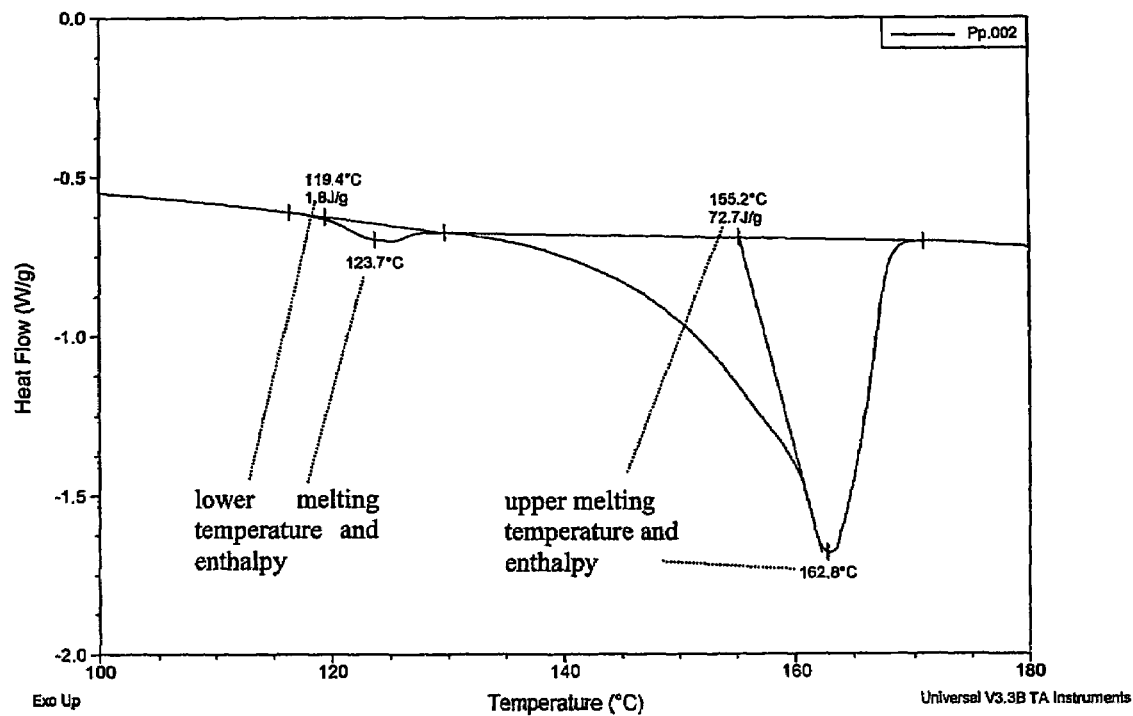
FIG. 17 is a graph of a second heating thermogram showing the melting temperatures and enthalpies for an exemplary PP sample.
Figure 18:
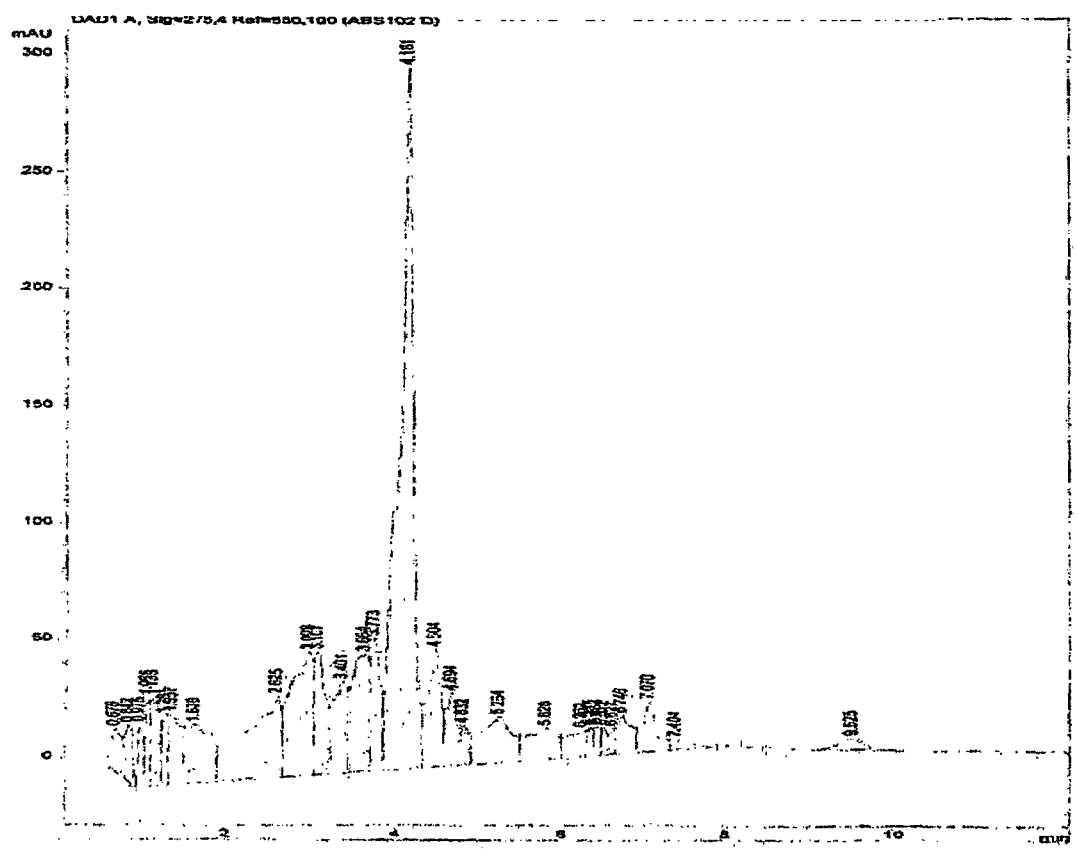
FIG. 18 is a HPLC chromatogram of an exemplary PP sample from Japanese white goods.

Approximately fifty individual flakes of various colors were taken from sources of JWG The flakes were analyzed using DSC and TGA. Differential scanning calorimetry (DSC) was performed using a TA Instruments DSC Q1000. The program used a heat-cool-heat cycle with 10° C./minute heating and cooling rates between 50° C. and 150° C. Thermograms from the cooling cycle were used to determine crystallization temperatures and enthalpies and thermograms from the second heating cycle were used to determine melting temperatures and enthalpies. FIGS. 16 and 17 are plots of heat flow as a function of temperature for PP samples, demonstrating the determination of the temperatures and enthalpies of melting and crystallization.

Thermogravimetric analysis (TGA) was performed using the dynamic high resolution feature of a TA Instruments TGA Q500. The resolution was set to 4.00 C and the sensitivity was set to 1.00. The heating rate was 50° C. per minute when the weight was not changing significantly. The samples were under a nitrogen purge until 500° C., at which time the samples were purged with dry air to complete the oxidation. The degradation temperatures reported below are the maxima of the derivative weight loss (with respect to temperature) curves. The PP flakes were found to typically have two melting points and two crystallization temperatures. When the source of polypropylene is white goods, the lower melting point is between about 114° C. and about 140° C. and has a melting enthalpy less than about 6 J/g. The upper melting point is between about 162° C. and about 168° C. and has an enthalpy of between about 70 J/g and about 95 J/g. The ratio of the lower to upper melting enthalpies, which should be related to the ethylene content in the polymer, is less than about 10. The higher crystallization temperature is between about 117° C. and about 133° C. and has an enthalpy of between 75 J/g and about 100 J/g. The lower crystallization temperature is between about 88° C. and about 117° C. and has an enthalpy of less than about 1.5 J/g. In addition, it has been found that the degradation temperature of the samples is between about 430° C. and about 432° C. Upper, lower and average values for the melting, crystallization and degradation temperatures are shown in Table 25.

TABLE 25

Melting and degradation temperature ranges and averages for PP from JWG

| Sample | $T_{m,lower}$ (° C.) | $T_{m,upper}$ (° C.) | $T_{deg}$ (° C.) |
|---|---|---|---|
| Low | 114 | 162 | 430 |
| high | 140 | 168 | 432 |
| average | 120 | 164 | 431 |

EXAMPLE 39

Improvement of PP from JWG

Light PP was derived from JWG. Two additives are used to improve the properties of the PP. Bennet BRC 100 is a compatibilizer which has been used commercially to improve the properties of ABS and HIPS. This additive makes nonpolar components, such as PP and HIPS, compatible with polymers with polar groups, such as ABS. Stereon 841A is a multiblock copolymer of styrene (44.5 wt. %) and butadiene and is used as an impact modifier for HIPS and polyolefin. Pellets of the light colored PP were compounded with 3 weight percent BRC 100 and 10 weight percent Stereon 841A in an injection molder. Mechanical properties of the samples are given in Table 26. Both modified samples are significantly tougher than the base PP sample, although the tensile strength dropped 5-10%.

TABLE 26

Mechanical Properties of Modified PP Samples

| Sample | NI (J/m) | TS@Y (MPa) |
|---|---|---|
| light PP | 62 | 24.8 |
| light PP + 3% BRC100 | 88 | 23.8 |
| light PP + 10% Stereon 841A | 120 | 22.3 |

EXAMPLE 40

Additives in PP

Additives were extracted from a sample of PP derived from JWG by dissolving the plastic in hot xylene and then precipitating the polymer with methanol. The extracted solution was analyzed using HPLC. Additives were detected by UV absorption at 254.4, 275.4 and 325.4 nm. FIG. 16 shows the HPLC chromatogram (absorbance at 275.4 nm) of the solution of extracted additives. The peaks likely correspond to trace additives from the PP sample.

EXAMPLE 41

Compounding PP with Glass Fiber

Polypropylene recovered from JWG was compounded with 0.2% of a primary/secondary antioxidant blend (Irganox B225) and 0-40% glass fibers. The properties of the various glass filled compounds are given in Table 26. All tensile strengths are for a crosshead speed of 0.2 inches per minute.

TABLE 26

Mechanical Properties of glass filled PP Samples

| % glass in PP | NI (J/m) | TS@Y (MPa) |
|---|---|---|
| 0 | 62 | 22.0 |
| 10 | 50 | 23.0 |
| 20 | 51 | 25.6 |
| 30 | 47 | 28.6 |
| 40 | 42 | 41.9 |

EXAMPLE 42

Consistency of PP Products

The properties of virgin PP polymers are significantly determined by the reaction conditions (temperature, reaction time, reactant concentrations), since these conditions determine the molecular weight and composition of the polymer. For recycled PP products, on the other hand, the properties are determined by factors such as the mix of feed materials and the separation process. Because the process is performed on a large scale, the mix of plastic flakes in the product is typically very consistent. The consistency of recycled PP products is shown schematically by FIG. 12. In FIG. 12, a mixture of flakes with various melt flow rates (determined by the molecular weight of the polymer in the flake) are compounded to create pellets with a very consistent melt flow rate. Even if the flakes are the same grade of plastic where the melt flow rate was only controlled between 5 and 7 g/10 min, the melt flow rate of the product pellets will have a tighter range of melt flow rates.

Figure 19:
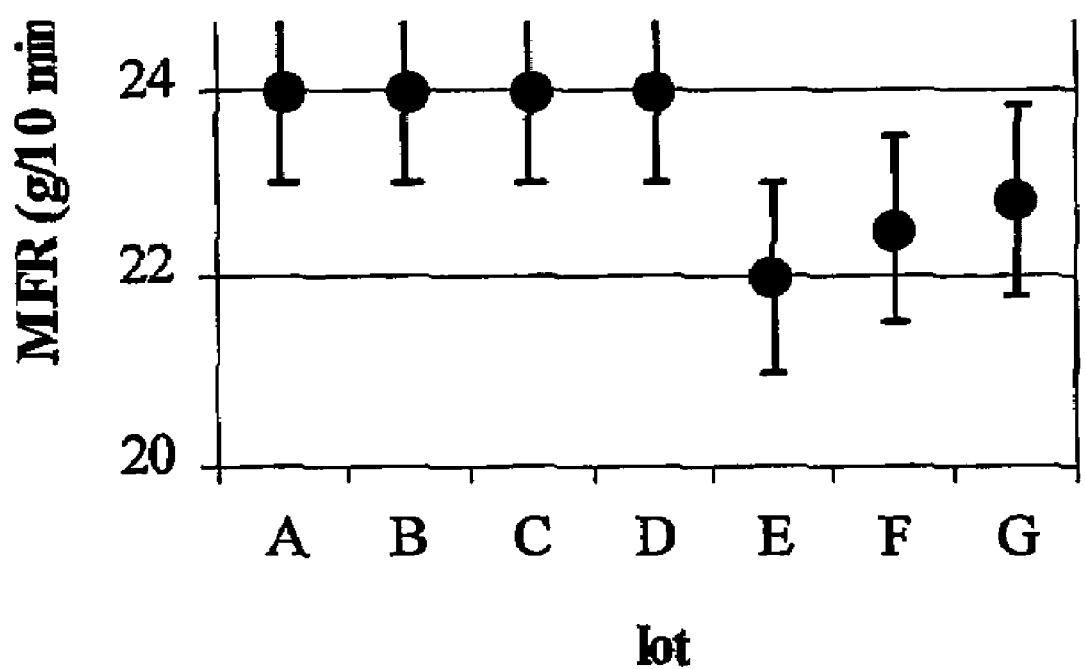
FIG. 19 shows the melt flow rate and notched izod impact strength consistency of various lots of recycled PP material derived from Japanese white goods.

FIG. 19 shows the melt flow rates for various lots (greater than 2000 lbs each) of recycled PP from JWG The Theological properties are very consistent (melt flow rate between 22 and 24 g/10 min) for these PP lots recovered from highly mixed feeds. Similar consistency is also observed for the notched izod impact strength and tensile strength for these products. The notched izod impact strength varies from 60 to 77 J/m and the tensile strength varies from 23.5 to 24.9 MPa for this PP product.

EXAMPLE 43

Antioxidants and Impact Modifiers to Improve the Properties of PC/ABS

Flakes containing PC/ABS and lesser amounts of ABS-FR and PC were obtained from a mixed source of OA. Pellets from the flakes as well as mixtures of the flakes were prepared with various impact modifiers and stabilizers. Irganox B900 (B900, from Ciba) is a combination of primary and secondary antioxidants, which should prevent oxidative degradation and should act as an acid scavenger to slow PC degradation. Epoxidized soybean oil (ESO) typically prevents PC degradation due to acids. Blendex 338 (B338, from GE) is a high rubber ABS which should improve the impact strength and lower the melt flow rate. Bennet BRC 100 is a reactive compatibilizer which should improve mechanical properties by improving the interfacial adhesion between PC and ABS.

Flakes were dried and compounded with undried additives using a 30 mm twin screw extruder with a temperature profile from 170° C. to 200° C. Pellets were dried and injection molded with a temperature profile from 170° C. to 200° C. Table 27 shows compositions and mechanical properties of the various formulations. Sample PC/ABS failed prior to yielding in the tensile test.

TABLE 27

Compositions and Mechanical Properties of PC/ABS formulations

| sample | % B900 | % ESO | % B338 | % BRC 100 | NI (J/m) | Tensile Strength (MPa) |
|---|---|---|---|---|---|---|
| PCABS | 0 | 0 | 0 | 0 | 21 | 40.4 |
| FD1 | 0.5 | 0 | 5 | 0 | 42 | 56.2 |
| FD2 | 0.5 | 0 | 3 | 2 | 85 | 52.7 |
| FD3 | 0 | 0.5 | 3 | 2 | 58 | 55.1 |

A number of embodiments of the invention have been described. Nevertheless, it will be understood that various modifications may be made without departing from the spirit and scope of the invention. Accordingly, other embodiments are within the scope of the following claims.

What is claimed is:
1. A blend of recycled thermoplastic resins, comprising:
a primary polymer type, wherein the primary polymer type is ABS and makes up about 80 to about 99 parts by weight of the blend;
residual additives including two or more additives selected from the group consisting of antioxidants, heat stabilizers, UV stabilizers, flame retardants, antistatics, blowing agents, impact modifiers, compatibilizers, fillers, fiber reinforcements, fluorescent whiteners, and lubricants, wherein the residual additives comprise about 2 to about 7 parts by weight of the blend; and
one or more secondary polymer types that are dissimilar to the primary polymer type and are selected from recycled blends of polycarbonate with an impact modified sty- rene acrylontirile copolymer, copolymer blends of styrene acrylonitrile and acrylate polymers, polysulfone, copolymers of styrene and acrylonitrile, polycarbonate, polyvinyl chloride, polyurethane, high impact styrene copolymers, general purpose polystyrene and polyolefin, wherein a first polymer of the one or more secondary polymer types is a styrene acrylonitrile copolymer that comprises about 0 to about 19 parts by weight of the blend and a second polymer of the one or more secondary polymer types comprises about 0 to about 7 parts by weight of the blend and the blend includes the secondary polymer type;

wherein:

the primary polymer type includes two or more grades of the primary polymer type, wherein different grades are characterized by different molecular weights, different molecular composition, different polymer structure or morphology, the blend of recycled thermoplastic resins includes a greater amount of the primary polymer type than the secondary polymer type, the blend is recovered from waste plastic material derived from one or more post consumer sources selected from office automation equipment, white goods, consumer electronics, automotive shredder residue, building waste and post industrial molding and extrusion scrap, the blend is a thermoplastic resin, the blend has a density of about 1.06 to about 1.10 grams per cubic centimeter, as determined by ASTM D 792, a melt flow rate of about 2 to about 9 grams per 10 minutes, as determined by ASTM D 1238, a tensile stress at yield of about 36 to about 48 MPa, as determined by ASTM D 638, a notched Izod impact (3.2 mm width of notch) of about 85 to about 200 Joules per meter, as determined by ASTM D 256 and the parts of the blend add up to 100.

2. The blend of claim 1, wherein one or more of the polymers of the primary or secondary polymer types exhibits detectible oxidation resulting from aging.

3. The blend of claim 1, wherein the residual additives include bromine and antimony, where the ratio of bromine to antimony is between about 1:1 and 10:1, and the bromine and the antimony are present at combined levels of about 1 ppm to about 5% by weight.

4. The blend of claim 1, wherein the residual additives include titanium dioxide at levels between about 0.5% by weight and about 5% by weight.

5. The blend of claim 1, wherein the residual additives include carbon black at levels between about 0.1% by weight and about 3% by weight.

6. The blend of claim 1, wherein the residual additives include one or more additional pigments or organic dye colorants at levels between about 1 ppm by weight and about 0.1% by weight.

7. The blend of claim 1, wherein the residual additives include two or more elements selected from the group consisting of Cd, Pb, Hg, Cr and Ni, the one or more elements being present at levels between about 0.1 ppm and 100 ppm.

8. The blend of claim 1, wherein:

one or more of the polymers of the secondary polymer types are a blend of polycarbonate with an impact modified styrene acrylonitrile copolymer, a copolymer blend of styrene acrylonitrile and acrylate polymers, a polysulfone, a copolymer of styrene and acrylonitrile, polycarbonate, polyvinyl chloride, or polyurethane.

9. The blend of claim 1, wherein at least one polymer of the one or more secondary polymer types is a high impact styrene copolymer polymer, where the high impact styrene copolymer is present in the resin in a substantial amount to achieve a user selected notched izod impact strength.

10. A blend of recycled thermoplastic resins, comprising:

a primary polymer type, wherein the primary polymer type is an impact modified styrene polymer that comprises about 70 to about 99 parts by weight of the blend;

one or more secondary polymer types that are dissimilar to the primary polymer type and are selected from recycled impact modified styrene acrylonitrile copolymers, blends of polycarbonate with an impact modified styrene acrylontirile copolymer, copolymer blends of styrene acrylonitrile and acrylate polymers, polysulfone, copolymers of styrene and acrylonitrile, polycarbonate, polyvinyl chloride, polyurethane, general purpose polystyrene and polyolefin, wherein a first polymer of the one or more secondary polymer types is a general purpose polystyrene that comprises about 0 to about 10 parts by weight of the blend and a second polymer of the one or more secondary polymer types comprises 0 to about 29 parts by weight of the blend, wherein the blend includes the second polymer type polymer; and residual additives including two or more additives selected from the group consisting of antioxidants, heat stabilizers, UV stabilizers, flame retardants, antistatics, blowing agents, impact modifiers, compatibilizers, fillers, fiber reinforcements, fluorescent whiteners, and lubricants, wherein the residual additives comprise about 1 to about 5 parts by weight of the blend;

wherein:

the primary polymer type includes two or more grades of the primary polymer type, wherein different grades are characterized by different molecular weights, different molecular composition, different polymer structure or morphology, the blend of recycled thermoplastic resins includes a greater amount of the primary polymer type than the secondary polymer type, the blend is recovered from waste plastic material derived from one or more post consumer sources selected from office automation equipment, white goods, consumer electronics, automotive shredder residue, building waste and post industrial molding and extrusion scrap, the blend is a thermoplastic resin having a density of about 1.04 to about 1.08 grams per cubic centimeter, as determined by ASTM D 792, a melt flow rate of about 2 to about 8 grams per 10 minutes, as determined by ASTM D 1238, a tensile stress at yield of about 20 to about 27 Mpa, as determined by ASTM D 638 and a notched Izod impact (3.2 mm width of notch) of about 60 to about 120 Joules per meter, as determined by ASTM D 256 and the parts of the blend add up to 100.

11. A blend of recycled thermoplastic resins, comprising:

a primary polymer type, wherein the primary polymer type includes a PP that comprises about 88 to about 99 parts by weight of the blend;

one or more secondary polymer types that are dissimilar to the primary polymer type and are selected from recycled impact modified styrene acrylonitrile copolymers, blends of polycarbonate with an impact modified styrene acrylonitrile copolymer, copolymer blends of styrene acrylonitrile and acrylate polymers, polysulfone, copolymers of styrene and acrylonitrile, polycarbonate, polyvinyl chloride, polyurethane, high impact styrene copolymers, general purpose polystyrene and polyolefin, wherein a first polymer of the one or more secondary polymer types comprises 0 to about 5 parts by weight of the blend and a second polymer of the one or more secondary polymer types comprises 0 to about 7 parts by weight of the blend and the blend includes the second polymer type; and residual additives including two or more additives selected from the group consisting of antioxidants, heat stabilizers, UV stabilizers, flame retardants, antistatics, blowing agents, impact modifiers, compatibilizers, fillers, fiber reinforcements, fluorescent whiteners, and lubricants, wherein the residual additives comprise about 1 to about 5 parts by weight of the resin;

wherein:

the primary polymer type includes two or more grades of the primary polymer type, wherein different grades are characterized by different molecular weights, different molecular composition, different polymer structure or morphology, the blend of recycled thermoplastic resins includes a greater amount of the primary polymer type than the secondary polymer type and the blend is recovered from waste plastic material derived from one or more post consumer sources selected from office automation equipment, white goods, consumer electronics, automotive shredder residue, building waste and post industrial molding and extrusion scrap, the blend is a thermoplastic resin, the resin has distinct melting points at about 125° C. and at about 164° C., the resin has a density of about 0.92 to about 0.96 grams per cubic centimeter, as determined by ASTM D 792, a melt flow rate of about 20 to about 30 grams per 10 minutes, as determined by ASTM D 1238, a tensile stress at yield of about 20 to about 28 MPa, as determined by ASTM D 638, a notched Izod impact (3.2 mm width of notch) of about 50 to about 100 Joules per meter, as determined by ASTM D 256 and the parts of the blend add up to 100.

12. A blend of recycled thermoplastic resins, comprising:

a primary polymer type, wherein the one or more polymers of the primary polymer type include a polycarbonate that comprises about 20 to about 98 parts by weight of the blend;

one or more secondary polymer types that are dissimilar to the primary polymer type and are selected from recycled impact modified styrene acrylonitrile copolymers, blends of polycarbonate with an impact modified styrene acrylonitrile copolymer, copolymer blends of styrene acrylonitrile and acrylate polymers, polysulfone, copolymers of styrene and acrylonitrile, polyvinyl chloride, polyurethane, high impact styrene copolymers, general purpose polystyrene and polyolefin, wherein a first polymer of the one or more secondary polymer types comprises 0 to about 79 parts by weight of an impact modified styrene acrylonitrile copolymer and a second polymer of the one or more secondary polymer types comprises 0 to about 10 parts by weight of the blend, wherein the blend includes the secondary polymer type; and residual additives including two or more additives selected from the group consisting of antioxidants, heat stabilizers, UV stabilizers, flame retardants, antistatics, blowing agents, impact modifiers, compatibilizers, fillers, fiber reinforcements, fluorescent whiteners, and lubricants, wherein the residual additives comprise about 2 to about 10 parts by weight of the resin; wherein the primary polymer type includes two or more grades of the primary polymer type, wherein different grades are characterized by different molecular weights, different molecular composition, different polymer structure or morphology; the blend of recycled thermoplastic resins includes a greater amount of the primary polymer type than the secondary polymer type and the blend is recovered from waste plastic material derived from one or more post consumer sources selected from office automation equipment, white goods, consumer electronics, automotive shredder residue, building waste and post industrial molding and extrusion scrap, wherein the blend is a thermoplastic resin having at a tensile strength of between 40.4 and 56.2 Mpa, as determined by ASTM D 638, a notched Izod impact (3.2 mm width of notch) of between 21 and 85 Joules per meter, as determined by ASTM D 256 and the parts add up to 100.

13. A method of preparing a recycled plastic material, comprising:

providing waste plastic material from one or more sources, wherein the sources are office automation equipment, white goods, consumer electronics, automotive shredder residue, building waste and post industrial molding and extrusion scrap, wherein the waste plastic material includes two or more dissimilar plastic types and contains non-plastic contaminants;

separating the waste plastic material into a plurality of fractions, wherein each fraction includes multiple grades of a primary polymer type, selected from one of ABS, HIPS, PP and PC, and one or more secondary polymer types selected from recycled impact modified styrene acrylonitrile copolymers, blends of polycarbonate with an impact modified styrene acrylonitrile copolymer, copolymer blends of styrene acrylonitrile and acrylate polymers, polysulfone, copolymers of styrene and acrylonitrile, polycarbonate, polyvinyl chloride, polyurethane, high impact styrene copolymers, general purpose polystyrene and polyolefin, the primary polymer type is different from the secondary polymer type and a fraction includes mostly the primary polymer type with a lesser amount of the secondary polymer type, and different grades are characterized by different molecular weights, different molecular composition, different polymer structure or morphology; and blending at least a first fraction to provide a recycled plastic material having at least one uniform predetermined property selected from the group consisting of melt flow rate and density.

14. The method of claim 13, further comprising combining at least one other fraction with the first fraction prior to blending.

15. The method of claim 13, further comprising:

separating one of the fractions into two or more secondary groups of plastic materials;

wherein the step of blending includes blending the first fraction with a group of the secondary groups of plastic materials.

16. The method of claim 13, wherein blending includes blending the first fraction with a virgin plastic.

17. The method of claim 13, wherein blending includes combining at least two plastic materials where each plastic is of a different primary polymer type.

18. The method of claim 13, wherein when the first fraction includes a primary polymer type and a second fraction includes the primary polymer type, the first fraction is distinguishable from the second fraction based on one or more properties of the first fraction.

19. The method of claim 13, further comprising compounding an additive or a polymer with the recycled plastic material.

20. The method of claim 13, further comprising determining amounts of the first fraction and at least one other plastic material to provide the uniform predetermined property including determining amounts of a first ABS material and a second ABS material that are combined to form a recycled plastic material having a notched izod impact strength higher than the notched izod impact strength of both the first ABS material and the second ABS material.

21. The method of claim 13, further comprising determining amounts of the first fraction and at least one other plastic material to provide the uniform predetermined property including determining amounts of an ABS material and a HIPS material that are combined to form a recycled plastic material having an increased tensile strength relative to a tensile strength of the HIPS material.

22. The method of claim 13, further comprising determining amounts of the first fraction and at least one other plastic material to provide the uniform predetermined property including determining amounts of a modified PPO material and a HIPS material that are combined to form a recycled plastic material having an increased notched izod impact strength and tensile strength and decreased melt flow rate relative to the HIPS material.

23. The method of claim 13, further comprising determining amounts of the first fraction and at least one other plastic material to provide the uniform predetermined property including determining amounts of an ABS material and a PC material that are combined to form a recycled plastic material having an increased notched izod impact strength and tensile strength relative to the ABS material.

24. The method of claim 13, further comprising determining amounts of the first fraction and at least one other plastic material to provide the uniform predetermined property including determining amounts of an ABS material and a regrind flame retarded PC material that are combined to form a recycled plastic material having an increased tensile strength relative to the ABS material.

25. The method of claim 13, further comprising determining amounts of the first fraction and at least one other plastic material to provide the uniform predetermined property including determining amounts of an ABS material and a PC/ABS material that can be combined to form a recycled plastic material having an increased notched izod impact strength and tensile strength relative to the ABS material.

26. The method of claim 13, further comprising determining amounts of the first fraction and at least one other plastic material to provide the uniform predetermined property including determining amounts of grades of ABS materials to form a recycled plastic material with a predetermined SAN content, wherein the predetermined SAN content is sufficient to achieve one or more predetermined properties, the properties including one of environmental stress crack resistance, tensile strength, impact strength, or melt flow rate of the recycled plastic material.

27. The method of claim 13, further comprising determining amounts of the first fraction and at least one other plastic material to provide the uniform predetermine property including determining amounts of a first ABS material and a second ABS material that are combined to form a recycled plastic material having a notched izod impact strength higher than the notched izod impact strength of the first ABS material lower than the second ABS material.

28. The method of claim 13, further comprising:
   selecting a secondary polymer that is compatible with the primary polymer type; and
   blending the secondary polymer with the first fraction.

29. The method of claim 28, wherein:
   selecting a secondary polymer includes selecting polypropylene, a low density polyethylene or a polymer with which polypropylene is compatible.

30. The method of claim 28, wherein:
   selecting a secondary polymer includes selecting polycarbonate, PC/ABS, an acrylonitrile butadiene styrene terpolymer, an acrylonitrile styrene acrylate copolymer or another polymer with which polycarbonate is compatible.

31. The method of claim 28, wherein:
   selecting a secondary polymer includes selecting an impact modified styrene polymer, a general purpose polystyrene, a modified polyphenylene ether or another polymer with which HIPS is compatible.

32. The method of claim 13, further comprising forming a pellet from the recycled plastic material.

33. The method of claim 13, further comprising extruding a sheet of the recycled plastic material.

34. The method of claim 33 further comprising co-extruding the recycled plastic material with layers containing one or more polymers, including impact modified styrene acrylonitrile copolymer, blends of polycarbonate with an impact modified styrene acrylonitrile copolymer, copolymer blends of styrene acrylonitrile and acrylate polymers, polysulfone, copolymers of styrene and acrylonitrile, polycarbonate, polyvinyl chloride, polyurethane, high impact styrene copolymers or polyolefins.

35. The method of claim 13 further comprising co-injection molding the recycled plastic material with layers containing one or more polymers, including impact modified styrene acrylonitrile copolymer, blends of polycarbonate with an impact modified styrene acrylonitrile copolymer, copolymer blends of styrene acrylonitrile and acrylate polymers, polysulfone, copolymers of styrene and acrylonitrile, polycarbonate, polyvinyl chloride, polyurethane, high impact styrene copolymers or polyolefins.

36. The blend of claim 10, wherein one or more of the polymers of the primary or secondary polymer types exhibits detectable oxidation resulting from aging.

37. The blend of claim 11, wherein one or more of the polymers of the primary or secondary polymer types exhibits detectable oxidation resulting from aging.

38. The blend of claim 12, wherein one or more of the polymers of the primary or secondary polymer types exhibits detectable oxidation resulting from aging.

39. The blend of claim 10, wherein the residual additives include bromine and antimony, where the ratio of bromine to antimony is between about 1:1 and 10:1, and the bromine and the antimony are present at combined levels of about 1 ppm to about 5% by weight.

40. The blend of claim 11, wherein the residual additives include bromine and antimony, where the ratio of bromine to antimony is between about 1:1 and 10:1, and the bromine and the antimony are present at combined levels of about 1 ppm to about 5% by weight.

41. The blend of claim 12, wherein the residual additives include bromine and antimony, where the ratio of bromine to antimony is between about 1:1 and 10:1, and the bromine and the antimony are present at combined levels of about 1 ppm to about 5% by weight.

42. The blend of claim 10, wherein the residual additives include titanium dioxide at levels between about 0.5% by weight and about 5% by weight.

43. The blend of claim 11, wherein the residual additives include titanium dioxide at levels between about 0.5% by weight and about 5% by weight.

44. The blend of claim 12, wherein the residual additives include titanium dioxide at levels between about 0.5% by weight and about 5% by weight.

45. The blend of claim 10, wherein the residual additives include carbon black at levels between about 0.1% by weight and about 3% by weight.

46. The blend of claim 11, wherein the residual additives include carbon black at levels between about 0.1% by weight and about 3% by weight.

47. The blend of claim 12 wherein the residual additives include carbon black at levels between about 0.1% by weight and about 3% by weight.

48. The blend of claim 10, wherein the residual additives include one or more additional pigments or organic dye colorants at levels between about 1 ppm by weight and about 0.1% by weight.

49. The blend of claim 11, wherein the residual additives include one or more additional pigments or organic dye colorants at levels between about 1 ppm by weight and about 0.1% by weight.

50. The blend of claim 12, wherein the residual additives include one or more additional pigments or organic dye colorants at levels between about 1 ppm by weight and about 0.1% by weight.

51. The blend of claim 10, wherein the residual additives include two or more elements selected from the group consisting of Cd, Pb, Hg, Cr and Ni, the one or more elements being present at levels between about 0.1 ppm and 100 ppm.

52. The blend of claim 11, wherein the residual additives include two or more elements selected from the group consisting of Cd, Pb, Hg, Cr and Ni, the one or more elements being present at levels between about 0.1 ppm and 100 ppm.

53. The blend of claim 12, wherein the residual additives include two or more elements selected from the group consisting of Cd, Pb, Hg, Cr and Ni, the one or more elements being present at levels between about 0.1 ppm and 100 ppm.

* * * * *